US006182071B1

(12) United States Patent
Fushimi

(10) Patent No.: US 6,182,071 B1
(45) Date of Patent: Jan. 30, 2001

(54) SORTING AND SUMMING RECORD DATA INCLUDING GENERATED SUM RECORD WITH SORT LEVEL KEY

(75) Inventor: Shinya Fushimi, Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/081,276

(22) Filed: May 20, 1998

(51) Int. Cl.$^7$ ........................................................ G06F 7/08
(52) U.S. Cl. .................................................. 707/7; 707/102
(58) Field of Search ........................................ 707/7, 102

(56) References Cited

U.S. PATENT DOCUMENTS

| | | | |
|---|---|---|---|
| 5,079,736 | 1/1992 | Kitsuregawa et al. | 395/600 |
| 5,101,408 | 3/1992 | Kitsuregawa et al. | 371/16.5 |
| 5,212,639 | * 5/1993 | Sampson et al. | 705/30 |
| 5,535,384 | 7/1996 | Kasahara | 395/600 |
| 5,710,937 | 1/1998 | Kasahara | 395/800 |
| 5,781,896 | * 7/1998 | Dalal | 707/2 |
| 6,023,696 | * 2/2000 | Osborn et al. | 707/3 |

OTHER PUBLICATIONS

"Database Machines and Knowledge Base Machines", edited by Kitsuregawa et al., 5th International Workshop on Database Machines Proceedings, pp. 89–102, 1987.
Fushimi et al., "Database Processor GREO", Information Processing, vol. 33, No. 12, Dec. 1992, pp. 1416–1423.

* cited by examiner

Primary Examiner—Kenneth S. Kim
(74) Attorney, Agent, or Firm—Leydig, Voit & Mayer, Ltd.

(57) ABSTRACT

The data processing apparatus implements high speed sorting and sum processing by detecting coinciding keys and non-coinciding level keys and performs a layered summing using a plurality of sort keys. The data processing apparatus is provided with a sum value record creating unit for creating sum value records for all combinations of the sort keys and attaching level keys, a sort processing unit for sorting all the data including input data and sum value records according to the sort keys, and a sum processing unit for summing the sorted data for every combinations at the accumulation registers and outputting the content of the accumulation registers corresponding to the sum level indicated by the level keys.

13 Claims, 17 Drawing Sheets

21: SORT PROCESSORS  2: SORT PROCESSING UNIT

Fig. 9

| DATA INPUT TO RECORD BUFFER | A00 | A01 | A02 | A03 | A10 | A11 | A12 | A13 | OUTPUT DATA |
|---|---|---|---|---|---|---|---|---|---|
| (TOKYO,110,TV ,0000,1,100) | 0 | 0 | 0 | 0 | 0 | 0 | 0 | 0 | |
| (TOKYO,110,TV ,0000,2,200) | 1 | 1 | 1 | 1 | 100 | 100 | 100 | 100 | |
| (TOKYO,110,TV ,0001,0,0) | 3 | 3 | 3 | 3 | 300 | 300 | 300 | 300 | |
| (TOKYO,110,RADIO,0000,1,30) | 3 | 3 | 3 | OUT | 300 | 300 | 300 | OUT | (TOKYO,110, TV ,3,300) |
| (TOKYO,110,RADIO,0001,0,0) | 4 | 4 | 4 | 1 | 330 | 330 | 330 | 30 | |
| (TOKYO,110, * ,0010,0,0) | 4 | 4 | 4 | OUT | 330 | 330 | 330 | OUT | (TOKYO,110,RADIO,1,30) |
| (TOKYO,110, * ,0001,0,0) | 4 | 4 | OUT | 0 | 330 | 330 | OUT | 0 | (TOKYO,110, * ,4,330) |
| (TOKYO,111,TV ,0001,0,0) | 4 | 4 | 0 | OUT | 330 | 330 | 0 | OUT | (TOKYO,111, TV ,0,0) |
| (TOKYO,111,RADIO,0001,0,0) | 4 | 4 | 0 | OUT | 330 | 330 | 0 | OUT | (TOKYO,111,RADIO,0,0) |
| (TOKYO,111, * ,0010,0,0) | 4 | 4 | OUT | 0 | 330 | 330 | OUT | 0 | (TOKYO,111, * ,0,0) |
| (TOKYO, * , * ,0100,0,0) | 4 | OUT | 0 | 0 | 330 | OUT | 0 | 0 | (TOKYO, * , * ,4,330) |
| (OSAKA,110,TV ,0001,0,0) | 6 | 2 | 2 | 2 | 390 | 60 | 60 | 60 | OUT (OSAKA,110, TV ,0,0) |
| (OSAKA,111,RADIO,0000,2,60) | 6 | 2 | 2 | OUT | 390 | 60 | 60 | OUT | (OSAKA,110,RADIO,2,60) |
| (OSAKA,110,RADIO,0001,0,0) | 6 | 2 | 2 | OUT | 390 | 60 | 60 | OUT | (OSAKA,110, * ,2,60) |
| (OSAKA,110, * ,0010,0,0) | 6 | 2 | 0 | OUT | 390 | 60 | OUT | 0 | (OSAKA,111, TV ,0,0) |
| (OSAKA,111,TV ,0001,0,0) | 6 | 2 | 0 | 0 | 390 | 60 | 0 | 0 | (OSAKA,111,RADIO,0,0) |
| (OSAKA,111,RADIO,0001,0,0) | 6 | 2 | 0 | 0 | 390 | 60 | 0 | 0 | (OSAKA,111, * ,0,0) |
| (OSAKA,111, * ,0010,0,0) | 6 | 2 | OUT | 0 | 390 | 60 | OUT | 0 | (OSAKA, * , * ,2,60) |
| (OSAKA, * , * ,0100,0,0) | 6 | OUT | 0 | 0 | 390 | OUT | 0 | 0 | ( * , * , * ,6,390) |
| ( * , * , * ,1000,0,0) | OUT | 0 | 0 | 0 | OUT | 0 | 0 | 0 | |

ACCUMULATION REGISTERS

D1~D4: DATA PROCESSING APPARTUS

SORTING AND SUMMING RECORD DATA INCLUDING GENERATED SUM RECORD WITH SORT LEVEL KEY

BACKGROUND OF THE INVENTION

1. Field of the Invention

The present invention relates to a database processing and a data processing performed in a computer system such as reordering and sorting a large quantity of data.

2. Description of the Related Art

In general, sorting is rarely processed on its own. The sorting is commonly used in combination with summing. An importance of combining the sorting and the summing in a data processing is described herewith. This will be described using an example. The example in Table 1 shows data of sales in a company.

TABLE 1

| PRODUCT | BRANCH | QUANTITY | SALES AMOUNT | DATE |
|---|---|---|---|---|
| TV | TOKYO | 2 | 200 | 3/15 |
| TV | OSAKA | 1 | 100 | 4/21 |
| RADIO | OSAKA | 4 | 100 | 4/21 |
| TV | OSAKA | 1 | 100 | 4/28 |
| RADIO | TOKYO | 1 | 25 | 5/10 |
| RADIO | TOKYO | 3 | 75 | 5/15 |

In this example, the data are being used for such summing as product quantity, sales amount per branch, and monthly total sales amount. Results of these summing are used to analyze the company's activities, markets, inventory controls and preparation for stocks. In Table 1, the data are being entered in an order of occurrence, or in other words, in a date order. Since the data are in the date order, upon summing of these data, sorting will be required for each of them, before summing the data. Results of the sorting are used to obtain the results of the summing.

For instance, when summing for sales amount per branch, a sorting is performed using a branch field. In the present specification, such field being used for sorting is called a "sort key". A result of the sorting using the branch field is shown in Table 2.

TABLE 2

| PRODUCT | BRANCH | QUANTITY | SALES AMOUNT | DATE | |
|---|---|---|---|---|---|
| TV | TOKYO | 2 | 200 | 3/15 | |
| RADIO | TOKYO | 1 | 25 | 5/10 | ADDED |
| RADIO | TOKYO | 3 | 75 | 5/15 | |
| TV | OSAKA | 1 | 100 | 4/21 | |
| RADIO | OSAKA | 4 | 100 | 4/21 | ADDED |
| TV | OSAKA | 1 | 100 | 4/28 | |

To the resulting data of Table 2, under the same branch field, values are summed together. To sum for the sales amount, the resulting data of Table 2 are searched from top to bottom, and by doing so the sales amount fields keeps on adding until a different branch field value, or in other words, a different sort key value is detected. The result obtained from this summing is shown in Table 3.

TABLE 3

| BRANCH | PRICE |
|---|---|
| TOKYO | 300 |
| OSAKA | 300 |

Further, certain cases of summing may involve a plurality of sort keys, for instance, a case such as summing for sales amount of products per every branch is one example. In such cases, a branch key is used as a first sort key and a product key is used as a next sort key when sorting the data. The result of sorting an original data of Table 1 using two sort keys is shown in Table 4.

TABLE 4

| BRANCH | PRODUCT | QUANTITY | SALES AMOUNT | DATE | |
|---|---|---|---|---|---|
| TOKYO | RADIO | 1 | 25 | 5/10 | |
| TOKYO | RADIO | 3 | 75 | 5/15 | ADDED |
| TOKYO | TV | 2 | 200 | 3/15 | |
| OSAKA | RADIO | 4 | 100 | 4/21 | |
| OSAKA | TV | 1 | 100 | 4/21 | ADDED |
| OSAKA | TV | 1 | 100 | 4/28 | |

Using the sorted result of Table 4, subtotals of each product for each branch and a total value of all the products in each branch are calculated. In this example, following branch and product combinations are obtained: Tokyo & Radio; Tokyo & TV; Osaka & Radio; and Osaka & TV. In addition to the four combinations, two subtotal sale values in Tokyo and Osaka and the total of the two subtotals are calculated. In this example, the sorted data are searched from the top to the bottom to search for the branch field and the product field combinations in order, and accompanying price field for each combination is added until a different combination is detected. Further, for the two different branch fields, the process outputs the subtotal per branch. The result is shown in Table 5.

TABLE 5

| BRANCH | PRODUCT | SALES AMOUNT |
| --- | --- | --- |
| TOKYO | RADIO | 100 |
| TOKYO | TV | 200 |
| TOKYO | SUBTOTAL | 300 |
| OSAKA | RADIO | 100 |
| OSAKA | TV | 200 |
| OSAKA | SUBTOTAL | 300 |
|  | TOTAL | 600 |

Summing using a plurality of sort keys will be called "layered summing" from hereinafter. As mentioned previously, in a data processing, it is indispensable to combine sorting in each field and summing, especially when dealing with a large quantity of accumulated data.

FIG. 13 illustrates a conventional data processing apparatus described in "Information Processing" Vol.33, No.12, p1416~1423. A description of the numbered components indicated in FIG. 13 are: a data processing apparatus 1; a sort processing unit 2; a sum processing unit 3; a control unit 6; a merge processing unit 7; and a host computer 8.

An operation of the conventional data processing apparatus is described next using FIG. 13. When a request for the data processing occur at the host computer 8, the host computer 8 sequentially sends data for processing to the data processing apparatus 1.

An amount of the data possible for sorting by the sort processing unit 2 depends on a memory capacity inside the sort processing unit 2. There are two cases of possible processing, depending on the amount of data sent from the host computer 8, that is, whether the data is over or under the sorting capacity.

(Case 1) A case when the data sent from the host computer is under the sorting capacity of the sort processing unit 2.

The case 1 is illustrated in (a) of FIG. 14. When the data is inputted to the data processing apparatus 1, a sorting is performed in the sort processing unit 2, then a summing is performed in the sum processing unit 3 using a result of the sort processing unit 2, and a result from the sum processing unit 3 is sent back to the host computer 8.

(Case 2) A case when the data sent from the host computer is over the sorting capacity of the sort processing unit 2. The data are processed using the following two phases.

(Phase 1)

The phase 1 of case 2 is illustrated in (b) of FIG. 14. The sort processing unit 2 creates a data sorted within the sorting capacity of the sort processing unit 2, and the data processing apparatus 1 returns a result of the sorting from the sort processing unit 2 to the host computer 8. In the phase 1, the sum processing unit 3 is not yet operating.

(Phase 2)

The phase 2 of the case 2 is illustrated in (c) of FIG. 14. The data sorted in part according to phase 1 is resent from the host computer 8 to the data processing apparatus 1. The sorted data is sent to the merge processing unit 7 for merging the sorted data, and the a resulting data from the merging is sent to the sum processing unit 3 for summing, and a result of the summing is returned to the host computer 8.

For both cases 1 and 2, series of controls are performed by the control unit 6. In the sort processing unit 2 comprising a plurality of sort processors P1, P2, P3 and P4 as shown in FIG. 15. A sort processor P1 takes two input data at a time and the two input data are reordered (sorted) and sent to the next step, as shown in FIG. 15. In the next step, a sort processor P2 takes two sorted input data that are two apiece and the sort processor P2 merges the two together to make a sorted four apiece data, and the four apiece data is sent to the next step, a sort processor P3. The operation similar is repeated onwards.

Using a plurality of sort processors, it is possible to start a processing before even completing the processing in a previous sort processor. In this way, by inputting data sequentially, though with some delay, a sorted result is outputted in parallel with the data input.

The merge processing unit 7 is described next. In general, merge processing unit is configured from a general-purpose processing unit such as microprocessor and controlled by its program. A flow of the process in the merge processing unit 7 is shown in FIG. 16. The flow presumes a descending sorting, and assumes for merging M sorted data sequences to one sorted data sequence.

In step S101 of FIG. 16, a number M of sorted data sequences for merging is loaded to a variable m. In step S102, a top data in m sorted data sequences are read. Table 6 is an example when the data sequences are M=2.

TABLE 6

| DATA EXAMPLE 1: 6,3,2,1 |
| --- |
| DATA EXAMPLE 2: 8,7,5,4 |

As the top data, 6 is read from the data sequence 1, and 8 is read form the data sequence 2.

Next, in step S103, a maximum value is searched for from data read at step S102. In this example, the maximum value is 8. In step S104, d is set to 8, and the data sequence which 8 belongs to is the data sequence 2, so i is set to 2. Step S105, outputs the value of d. In step S106, a next data is read from the data sequence with loaded number i. In this example, i=2, and the next data in data sequence 2 is 7, therefore, data 7 is read. Such process continues on, and step S107 is a step to determine whether all data has disappeared from the data sequence or not. When a data still remains, the process continues and return to step S103. When there is no more data in the data sequence, a number of data sequences m for processing is reduced by 1 in step S108, and the process returns and continues from step S103. When m=0 in step S109, the process completes.

The sum processing unit 3 is described next. In general, sum processing unit is configured from a general-purpose processing unit such as microprocessor and controlled by its program. The flow of processing in the sum processing unit 3 is illustrated in FIG. 17.

In step S121 of FIG. 17, an invalid key value is loaded to a variable PK, and a variable AC is initialized to 0. The variable PK keeps a previous sort key value which is processed previous to the processing data. Likewise, the variable AC keeps the sum value of the field to this point. Then, the next data is read at step S122, and the sort key value is kept at variable K, and the sum value is kept at V. If the sorting result has been read through completely, the process completes at step S123. If not, the key value kept at the variable K is compared with the previous sort key value at the variable PK in step S124.

When the compared sort key values are found to be not coinciding, the sum value kept at AC is outputted (step S125) and V is set to AC (step S126). When outputting the sum value, the sum value is written to the currently reading data and outputted.

If, however, the sort key values are coinciding, there is no need to output the data, therefore, the data is deleted in step S127. In step S128, V is added to AC.

For both cases mentioned previously, PK is updated to K in step S129, and the process returns to the step S122.

As such, as long as the data with the coinciding sort key values are inputted, the values keep on adding, and when the data with a different sort key value is detected, then at this point the sum value is outputted. Note that for any cases, the sort key value set to PK in step S121 are assumed to be coinciding with any other sort key values.

For a case when there are a plurality of sort keys, these sort keys are combined as one key and processed according to the previously described flow. Also, when there are a plurality of sum fields (S fields) present, for example, in addition to calculating totals of the price and the quantity, the S number of AC are prepared and the steps S125, 126, 128 are repeated S times each.

The conventional data processing apparatus as previously described has the following problems.

The step S124 in the previously described sum processing unit is the comparing process between the sort key value of a previous data and the sort key value of the current data. As a general way to deal with varied key lengths for every sorting, the comparing process is executed by 1 byte at a time. Due to this, there is a problem of decline in the processing performance.

When a plurality of keys are present in the previously described sum processing, the keys are taken in group as one. Therefore, the layered summing is difficult to perform. For example, when Table 7 is sorted for the branch and the product, followed by summing, a result is shown in Table 8.

TABLE 7

| PRODUCT | BRANCH | QUANTITY | SALES AMOUNT | DATE |
|---------|--------|----------|--------------|------|
| TV | TOKYO | 2 | 200 | 3/15 |
| TV | OSAKA | 1 | 100 | 4/21 |
| RADIO | OSAKA | 4 | 100 | 4/21 |
| TV | OSAKA | 1 | 100 | 4/28 |
| RADIO | TOKYO | 1 | 25 | 5/10 |
| RADIO | TOKYO | 3 | 75 | 5/15 |

TABLE 8

| BRANCH | PRODUCT | SALES AMOUNT |
|--------|---------|--------------|
| TOKYO | RADIO | 100 |
| TOKYO | TV | 200 |
| TOKYO | SUBTOTAL | 300* |
| OSAKA | RADIO | 100 |
| OSAKA | TV | 200 |
| OSAKA | SUBTOTAL | 300* |
| | TOTAL | 600* |

The sum value marked with asterisk (*) in Table 8 need to be calculated using alternative means. Therefore, the whole system become complex, which leads to a decline in the performance.

A difficulty in the conventional layered summing is knowing a number of data before outputting the sum value from every different sort keys. For example, data inputted as shown in Table 9, its sum value is shown in Table 10, and a result in Table 10 has a greater number of data than a number of input data in Table 9.

TABLE 9

| PRODUCT | BRANCH | QUANTITY | SALES AMOUNT | DATE |
|---------|--------|----------|--------------|------|
| TV | TOKYO | 2 | 200 | 3/15 |
| TV | OSAKA | 1 | 100 | 4/21 |
| RADIO | OSAKA | 4 | 100 | 4/21 |
| RADIO | TOKYO | 3 | 75 | 5/15 |

TABLE 10

| BRANCH | PRODUCT | SALES AMOUNT |
|--------|---------|--------------|
| TOKYO | RADIO | 75 |
| TOKYO | TV | 200 |
| TOKYO | SUBTOTAL | 275 |
| OSAKA | RADIO | 100 |
| OSAKA | TV | 100 |
| OSAKA | SUBTOTAL | 200 |
| | TOTAL | 475 |

For such case when the number of data after summing will be more than the number of input data, for example, it is possible to use an original data space to output totals of radio and TV in Tokyo branch, however, there is no place that can be used to output the grand total of Tokyo in the original data space. With the conventional method, the sum processing using a plurality of keys are difficult. In addition, when there happens to be no sale in a particular day, this can result in an another problem in the summing. That is, if no TV was sold on March 15th, for example, under the previously described process, the sum value of TV will not be outputted. The sum value indicating 0 for TV sales is required.

When a plurality of sum fields are present as in the previously described summing, the summing need to be repeated several times, which leads to problem with a decline in processing speed.

When input data to the data processing apparatus exceeds the capacity of the sort processing unit, the summing and the layered summing are difficult to perform. In this case, the data for the summing and layered summing are returned to the host computer, therefore, there is a problem with the decline in performance.

For example, sums for such as Tokyo and Osaka are performed as it is. However, there is a case that a vicinity of Tokyo is summed as "Others". Such change of a sum level is difficult.

SUMMARY OF THE INVENTION

The present invention aims to solve the described problems. The present invention aims to detect coinciding keys and non-coinciding level keys upon summing in high speed. The present invention aims to perform in high speed a layered summing using a plurality of sort keys. The present invention aims to implement high-speed sorting and summing for a large quantity of data using a plurality of the data processing apparatuses.

These and other objects are accomplished by the present invention as hereinafter described in further detail.

According to one aspect of the present invention, a data processing apparatus for processing a data record having a sort key comprises: a sum value record creating unit for creating a sum value record, for summing data in the data record, using the sort key; a sort processing unit for sorting the data record and the sum value record; and a sum processing unit for inputting the data record and the sum value record sorted by the sort processing unit, and for summing the data in the data record to the sum value record.

According to another aspect of the present invention, the sum value record creating unit sets a sort key of the sum value record so as to position the sum value record after the data record by sorting of the sort processing unit.

According to another aspect of the present invention, the sum value record creating unit creates a field for identifying the data record and the sum value record and attaches to the data record and the sum value record. The sum processing unit performs summing based on the field, without having to compare the sort key of the data record and the sum value record.

According to another aspect of the present invention, the sort key of the data record comprises a plurality of K sort keys layered (K≧1). The sum value record creating unit creates a level key in the field for indicating one of K sum levels. The sum processing unit sums data for the K sum levels based on the level key.

According to another aspect of the present invention, the sum value record creating unit creates the sum value records having K sort keys created by all combinations of all values of the K sort keys.

According to another aspect of the present invention, the sum value record creating unit creates a sum value record having the K sort keys created by all combinations of all values of the every upper layer sort keys in the layered sort keys.

According to another aspect of the present invention, the sum value record creating unit uses one of a high value and a low value to crate one of the K sort keys.

According to another aspect of the present invention, a data processing apparatus for processing a data record having a sort key comprises: a key replacement unit for inputting the data record and replacing the sort key of the data record; a sort processing unit for sorting the data record using a replaced sort key; and a processing unit for inputting and processing a sorted data record.

According to another aspect of the present invention, a data processing system comprises: a host computer; a first data processing apparatus for processing X data; and a second data processing apparatus for processing Y data. The first data processing apparatus input X data, the second data processing apparatus inputs Y−1 data, and the first processing unit outputs a processed X data to the second data processing apparatus. The second data processing apparatus inputs the processed X data, and the second data processing apparatus outputs X+Y−1 data.

According to another aspect of the present invention, a data processing apparatus comprises: a sum value record creating unit for inputting an input data with K (K≧1) sort keys, attaching a level key indicating a sum level of data to the input data, outputting the input data, and for creating data with an identical format as the input data for all combinations of all values of the K sort keys and for all sum levels, attaching a level key indicating a sum level of the data to the created data, and outputting the created data; a sort processing unit for sorting all of the input data and the created data using the K sort keys; and a sum processing unit having K+1 accumulation registers for summing the sorted data separately, and outputting a content of a accumulation register corresponding to the sum level indicated by the level key.

According to another aspect of the present invention, the data processing apparatus further comprises a key replacement unit for replacing a sort key of the input data with a pre-determined sort key, and for outputting the input data with a replaced sort key to the sum value record creating unit.

According to another aspect of the present invention, the data processing apparatus further comprises a memory unit and a merge processing unit, in which the sort processing unit repeats a divisional processing for data with a processing possible capacity without summing the data and stores a plurality of sorted data in the memory unit. The merge processing unit reads the plurality of sorted data from the memory unit and merges the plurality of the sorted data.

According to another aspect of the present invention, the data processing apparatus further comprises a memory unit, and a merge processing unit, in which the sort processing unit repeats a divisional processing for a data with a processing possible capacity with summing the data and stores a sorted data in the memory unit. The merge processing unit reads the plurality of sorted data from the memory unit and merges the plurality of the sorted data.

According to another aspect of the present invention, a data processing method comprises the following steps: inputting an input data and attaching a level key indicating a sum level of data to the input data; creating a first data having all combinations of all values of K sort keys, and having an identical format as the input data, and attaching a level key indicating a sum level of data to a created data; creating a second data with the identical format by replacing a sort key in a low position to a high position of the K sort keys with an identification data equating with one of a high value and a low value, in an order from the low position to the high position, for all combinations of all values of the K sort keys; and sorting all of the data using the sort keys.

According to another aspect of the present invention, the data processing method further comprises a step of setting bits of the level key for the following data: for the input data, all the bits in the level key is 0; for the first data created with the identical format as the input data, a bit at a lowest position in the level key is 1 and the other bits are 0; for the second data, a bit position corresponding to one of a position of the identification data in the highest position in the level key is 1 and the other bits are 0. The data processing method further comprises a step of outputting a sum value for the data corresponding to a sum level where one of the bits in the level key is 1.

According to another aspect of the present invention, for a data processing system comprising of M data processing apparatuses, in which a capacity of data processing in one of the M data processing apparatuses is N, the data processing method comprises the following steps: inputting N−1 data to each one of the M data processing apparatuses; inputting a last one data to a first data processing apparatus after completing the inputting step of N−1 data; inputting a result of processing in the first data processing apparatus to a second data processing apparatus; and repeating a same processing to a Mth data processing apparatus to obtain a result of the Mth data processing apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications with the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein

FIG. 9 is showing the state of summation result for the embodiment 1;

DETAILED DESCRIPTION OF THE PREFERRED EMBODIMENTS

Figure 1:
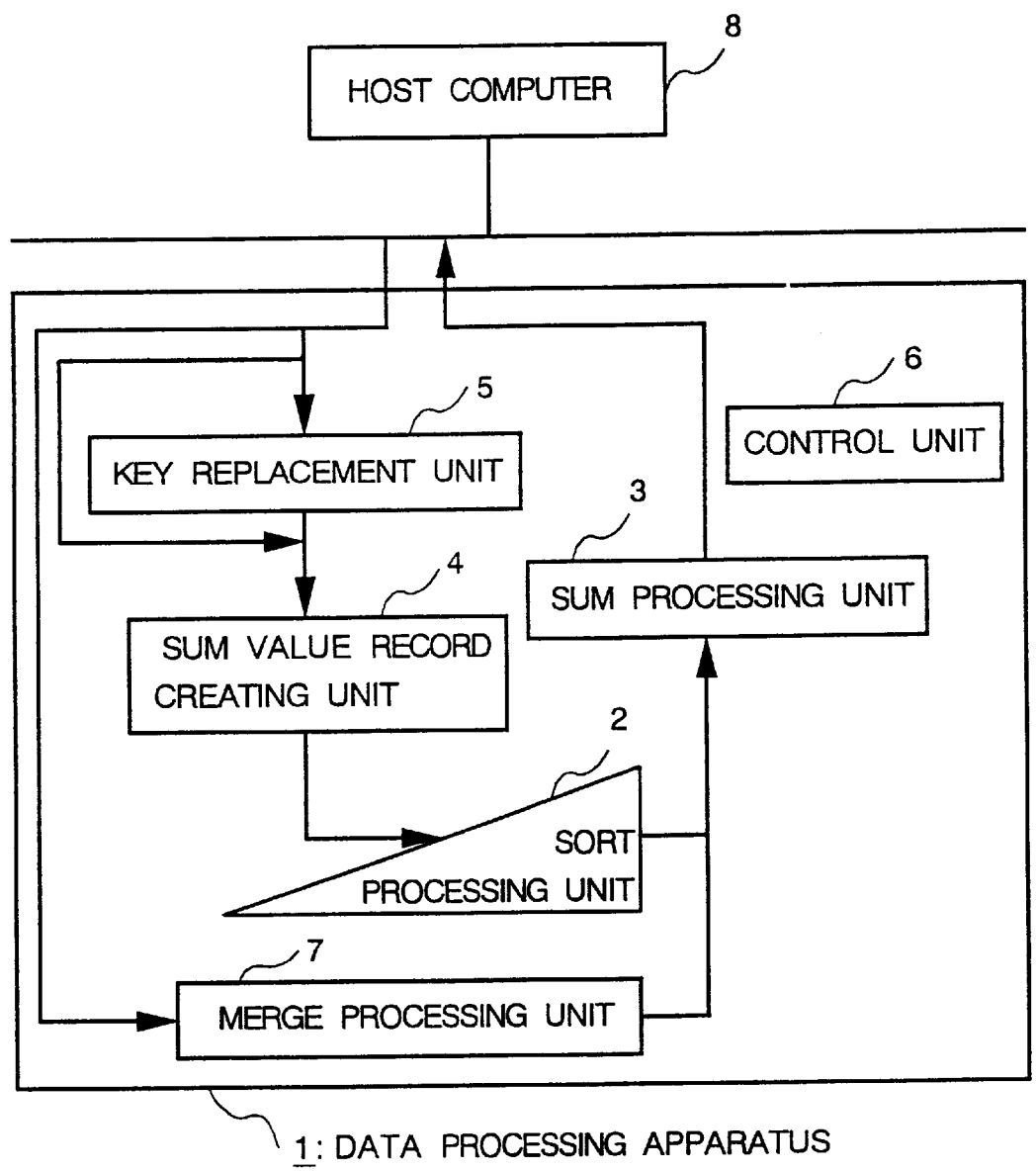
FIG. 1 illustrates the configuration of the data processing apparatus for the embodiment 1.

Reference will now be made in detail to the present preferred embodiments of the invention, examples of which are illustrated in the accompanying drawings, wherein like reference numerals indicate like elements throughout the several views.

Embodiment 1

The preferred embodiment 1 of the present invention is described using the figures. The preferred embodiment 1 is a case for using a single data processing apparatus.

FIG. 1 illustrates a configuration of the data processing apparatus for the preferred embodiment 1 of the present invention. A description of the numbered components indicated in the FIG. 1 follows: the data processing apparatus 1; the sort processing unit 2 for performing a sorting process; the sum processing unit 3 for adding the data after the sorting; a sum value record creating unit 4 for creating records; a key replacement unit 5 for replacing key value when required; the control unit 6 for controlling the data processing apparatus 1; the merge processing unit 7 for merging the data after sorting; and the host computer 8 for inputting data to the sort processing unit 2 and collecting an output data from the sort processing unit 2.

An operation of the data processing apparatus is described next. When a data processing request is made to the host computer 8, the host computer sends a key replacement information and a layered key information to the data processing apparatus 1. The key replacement information is an information to replace a sort key. The layered key information is a collection of all values for all sort keys. The key replacement information is set at the key replacement unit 5. The layered key information is set at the sum value record creating unit 4. When the setting of these information are completed, the host computer 8 sequentially sends processing data having at least one sort key field and at least one summing field to the data processing apparatus 1. When these data are sent, the data processing apparatus 1 sends the data to the key replacement unit 5.

Figure 4:
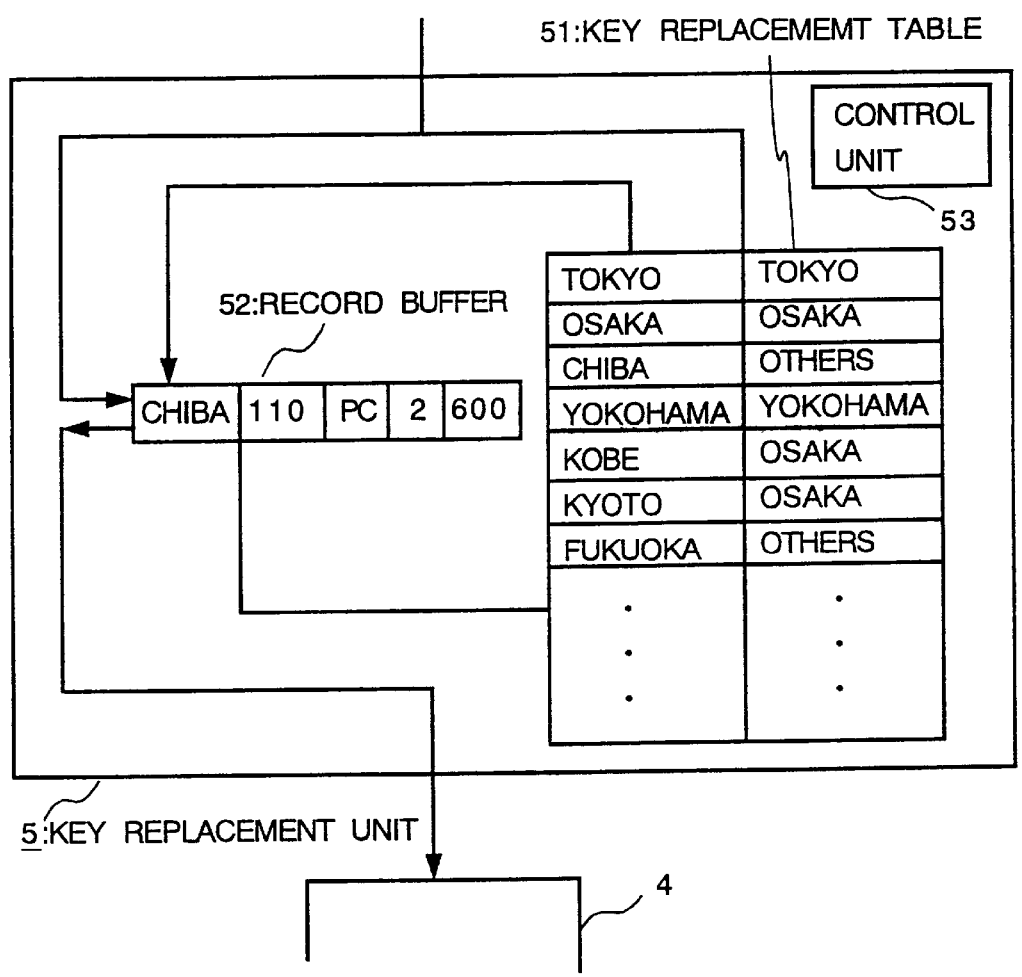
FIG. 4 illustrates the configuration of the key replacement unit for the embodiment 1.

The key replacement unit 5 replaces the value of keys in the sent data that need to be replaced, and a replaced result is sent to the sum value record creating unit 4. An interior of the key replacement unit is illustrated in FIG. 4. The description of the numbered components indicated in the FIG. 4 follows: a key replacement table 51; a record buffer 52; and a control unit 53. The key replacement unit 5 sets the key replacement information to the key replacement table 51. Then each one of the data sent from the host computer 8 is inputted in order to the record buffer 52. A portion of sort key is taken out from the input data in the record buffer 52, and this sort key is searched in the key replacement table 51 to find a corresponding new key, and the sort key of the record buffer 52 is replaced with the new key. FIG. 4 illustrates an example when the key value of data in the record buffer 52 is "Chiba", the key value "Chiba" is replaced to "Others". Using this mechanism, change of the sum level becomes possible. The data with replaced keys are taken out from the record buffer 52, and are sent to the sum value record creating unit 4. This operation is performed repeatedly to the data being sent from the host computer 8. All processes mentioned above are controlled by the control unit 53.

Figure 5:
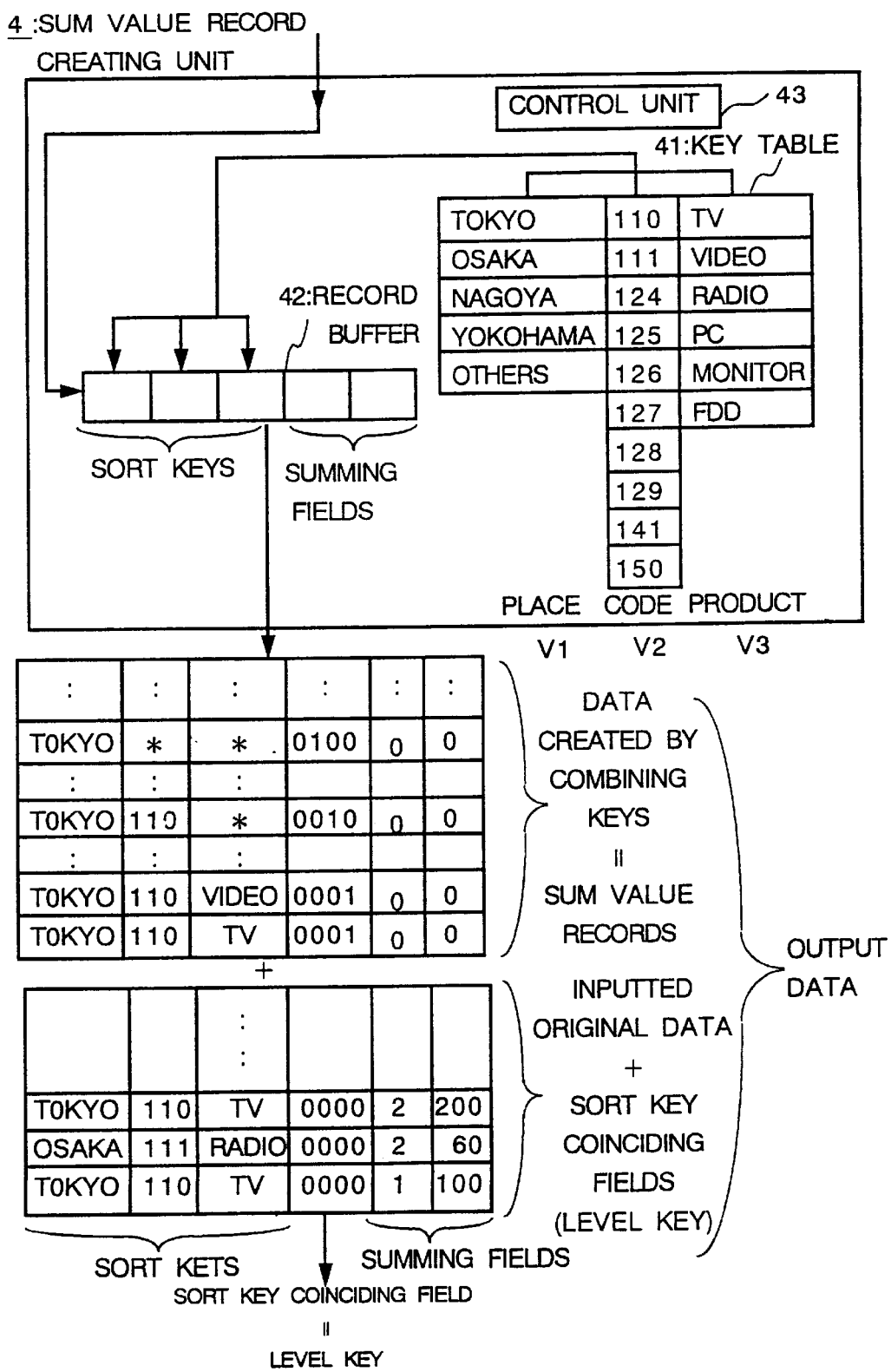
FIG. 5 illustrates the configuration of the sum value record creating unit for the embodiment 1.

An example of the configuration of the sum value record creating unit 4 is shown in FIG. 5. FIG. 5 shows that the record has three sort keys and two summing fields. The description of the numbered components indicated in FIG. 5 follows: a key table 41; a record buffer 42; and a control unit 43. The sum value record creating unit 4 sets the layered key information sent from the host computer 8 to the key table 41. For all of the sort keys used in summing, the key table 41 holds all of the values under each one of the sort keys. A number of the keys are denoted as K from hereinafter. In FIG. 5, three sort keys are "place", "code", and "product" (K=3), and all the values under the three sort keys are shown. A number V1 of the values for sort key "place" is 5 (V1=5). A number V2 of the values for sort key "code" is 10 (V2=10). A number V3 of the values for sort key "product" is 6 (V3=6).

The sum value record creating unit 4 inputs data sent from the key replacement unit 5 to the record buffer 42. A sort key coinciding field (a level key) is inserted immediately after the sort keys of each original data. The sort key coinciding field is used as a level key which indicates a sum level. For K sort keys, the sort key coinciding field consists of K bits (0 to K−1th bits). After setting the sort key coinciding field to 0, the data is sent to the next sort processing unit 2 (step S1).

When all of the data are sent from the host computer 8, a plurality of sum value records (the number of records are V1×V2×V3) are created using all the sort key value combinations in the key table 41. The sum value record has same record format with the record outputted from the record buffer 42. The field values of the two summing fields of the sum value records are set to 0. Further, in an order from low position of sort keys to high position of sort keys, the sum value records are created each time the sort keys are replaced to the high value (indicated by asterisk * in figures) to the record buffer 42. A value that is greater than the other key values is used as the high value for a case of ascending sort (for a case of descending sort, a minimum value is used instead). This high value is indicating that it is used upon obtaining a total value of the field values for that key level.

For example, Table 11 is the key table 41.

TABLE 11

| | |
|---|---|
| PLACE: | TOKYO, OSAKA |
| CODE: | 110, 111 |
| PRODUCT: | TV, RADIO |

When there are two fields to combine, a result is created as shown in Table 12.

TABLE 12

| | |
|---|---|
| (TOKYO, 110, TV, 0, 0) | TOTAL OF TOKYO, 110, TV |
| (TOKYO, 110, RADIO, 0, 0) | TOTAL OF TOKYO, 110, RADIO |
| (TOKYO, 110, *, 0, 0) | SUBTOTAL OF TOKYO, 110 |
| (TOKYO, 111, TV, 0, 0) | TOTAL OF TOKYO, 111, TV |
| (TOKYO, 111, RADIO, 0, 0) | TOTAL OF TOKYO, 111, RADIO |
| (TOKYO, 111, *, 0, 0) | SUBTOTAL OF TOKYO, 111 |
| (TOKYO, *, *, 0, 0) | SUBTOTAL OF TOKYO |
| (OSAKA, 110, TV, 0, 0) | TOTAL OF OSAKA, 110, TV |
| (OSAKA, 110, RADIO, 0, 0) | TOTAL OF OSAKA, 110, RADIO |
| (OSAKA, 110, *, 0, 0) | SUBTOTAL OF OSAKA, 110 |
| (OSAKA, 111, TV, 0, 0) | TOTAL OF OSAKA, 111, TV |
| (OSAKA, 111, RADIO, 0, 0) | TOTAL OF OSAKA, 111. RADIO |
| (OSAKA, 111, *, 0, 0) | SUBTOTAL OF OSAKA, 111 |
| (OSAKA, *, *, 0, 0) | SUBTOTAL OF OSAKA |
| (*, *, *, 0, 0) | GRAND TOTAL |

In the Table 12, asterisk (*) denotes to the high value. The combinations that includes the high values and the number of such combinations are shown in Table 13.

TABLE 13

| |
|---|
| ( , , * ) : V1 × V2 |
| ( , *, * ) : V1 |
| ( *, *, * ) : 1 |

The sum value record creating unit 4 places the K+1 bits of sort key coinciding field to the created sum value record immediately after the sort keys as well as to the original data inputted. The values of the sort key coinciding fields are set as described below, and after that, the data is sent to the sort processing unit 2.

For the sum value record created from combinations of all values of the sort keys, Kth bit of the sort key coinciding field is set to 1, and all other (0 to K−1th) bits are set to 0. For the sum value record created by combining with the high values, a bit of the sort key coinciding field corresponding to the field number where the leftmost high value is placed is set to 1 and all other bits are set to 0. For this case, the field number is counted from the left in an order of 0, 1, 2 . . . , and the sort key coinciding field is similarly counted in order from the left (0, 1, 2 . . . ).

As an inclusive practical example, the data shown in the Table 14 are inputted to the sum value record creating unit 4 from the key replacement unit 5.

TABLE 14

| |
|---|
| (TOKYO, 110, TV, 1, 100) |
| (OSAKA, 111, RADIO, 2, 60) |
| (TOKYO, 110, TV, 2, 200) |
| (TOKYO, 110, RADIO, 1, 30) |

When a sort key table is same as the key table 41 shown in FIG. 5, the data shown in Table 15 are outputted from the sum value record creating unit 4.

TABLE 15

| | | |
|---|---|---|
| (TOKY0, 110, TV, 1000, 1, 100) | | |
| (OSAKA, 111, RADIO, 0000, 2, 60) | | |
| (TOKYO, 110, TV, 0000, 2, 200) | ORIGINAL DATA INPUT | |
| (TOKYO, 110, RADIO, 0000, 1, 30) | | |
| (TOKYO, 110, TV, 0001, 0, 0) | | TOTAL OF TOKYO, 110, TV |
| (TOKYO, 110, RADIO, 0001, 0, 0) | | TOTAL OF TOKYO, 110, RADIO |
| (TOKYO, 110, *, 0010, 0, 0) | | SUBTOTAL OF TOKYO, 110 |
| (TOKYO, 111, TV, 0001, 0, 0) | | TOTAL OF TOKYO, 111, TV |
| (TOKYO, 111, RADIO, 0001, 0, 0) | | TOTAL OF TOKYO, 111, RADIO |
| (TOKYO, 111, *, 0010, 0, 0) | | SUBTOTAL OF TOKYO, 111 |
| (TOKYO, *, *, 0100, 0, 0) | | SUBTOTAL OF TOKYO |
| (OSAKA, 110, TV, 0001, 0, 0) | CREATED DATA | TOTAL OF OSAKA, 110, TV |
| (OSAKA, 110, RADIO, 0001, 0, 0) | | TOTAL OF OSAKA, 110, RADIO |
| (OSAKA, 110, *, 0010, 0, 0) | | SUBTOTAL OF OSAKA, 110 |
| (OSAKA, 111, TV, 0001, 0, 0) | | TOTAL OF OSAKA, 111, TV |
| (OSAKA, 111, RADIO, 0001, 0, 0) | | TOTAL OF OSAKA, 111, RADIO |
| (OSAKA, 111, *, 0010, 0, 0) | | SUBTOTAL OF OSAKA, 111 |
| (OSAKA, *, *, 0100, 0, 0) | | SUBTOTAL OF OSAKA |
| *, *, *, 1000, 0, 0) | | GRAND TOTAL |

A result shown in Table 15 are sent to the sort processing unit 2, where the sorting is executed.

Figure 2:
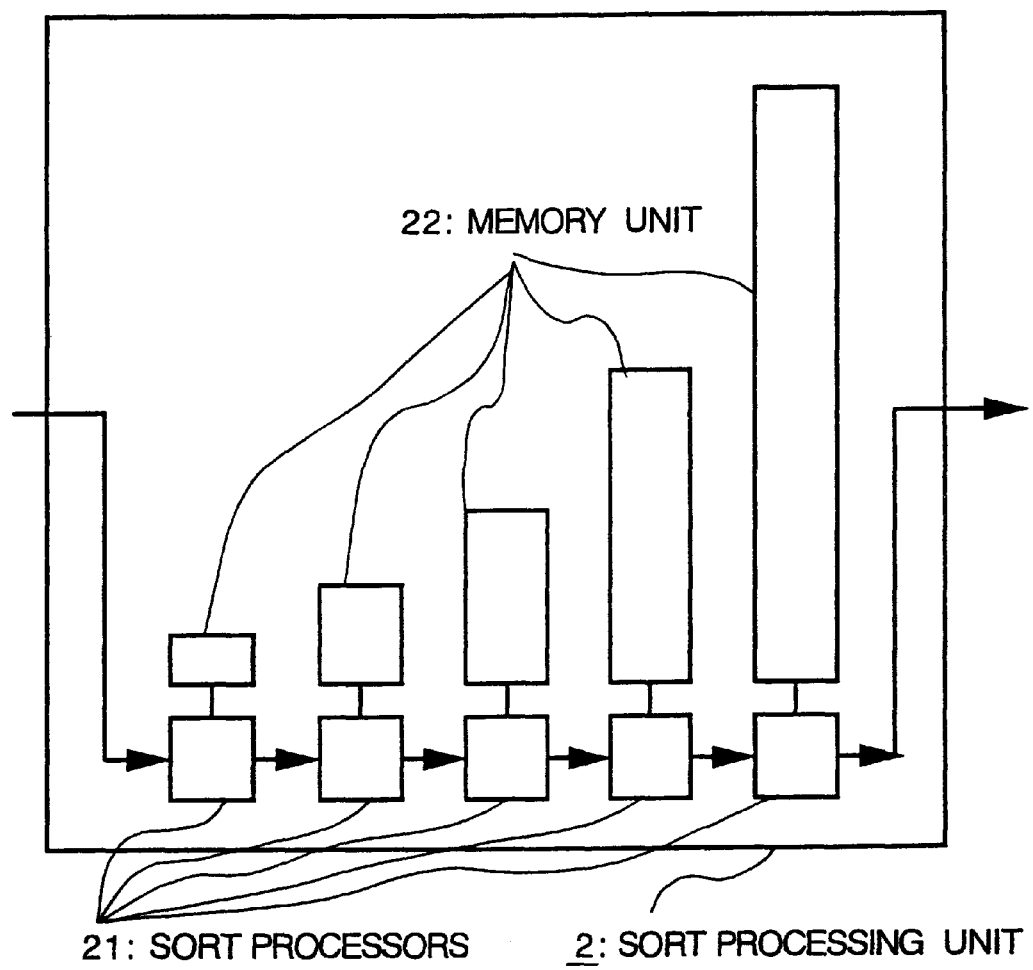
FIG. 2 illustrates the configuration of the sort processing unit for the embodiment 1.

FIG. 2 illustrates an inner configuration of the sort processing unit 2. FIG. 2 illustrates a pipeline merge sorter which linearly connects a plurality of to sort processors 21 and a plurality of memory units 22.

A detailed description of an operation for the sort processing unit 2 follows next. The sort processing unit 2 sequentially inputs a sequence of data sent from the host computer 8, which is reordered in the order as specified, and the result of the reordering is returned to the host computer 8. The sort processing unit 2 is configured from a group of sort processors 21, with memory units 22, linearly connected. The sort processor 21 are named from a leading No. 1 sort processor, No. 2 sort processor, and No. 3 sort processor. No. i sort processor, for example, has a memory unit 22 with a capacity of $2^{i-1}$ data.

As an example of the operation for the sort processing unit 2, an input data shown in Table 16 is inputted to the sort processing unit 2 in an order indicated.

TABLE 16

| 8, 2, 1, 3, 5, 7, 6, 4, ... |
|---|

First, the leading No. 1 sort processor 21 takes out two data at a time from the input data, and the two data are reordered and are sent to the next No. 2 sort processor 21. In the next No. 2 sort processor 21, the data that were sorted in the No. 1 sort processor 21 by two data at a time is shown in Table 17.

TABLE 17

| 82, 31, 75, 64, ... |
|---|

In Table 17, an order of input data 1 and 3 is replaced from Table 16, and is outputted in combination of the two data in the order of 31. The next sort processor, which is the No. 2 sort processor, the combined two data, are merged to make four and this is sorted and sent to the next No. 3 sort processor. A result is shown in Table 18.

TABLE 18

| 8321, 7654, ... |
|---|

For example, when 82 and 31 are merged and sorted in the No. 3 sort processor, the data become 8321. The No. 3 sort processor inputs the sorted data, and two of these data is merged to make eight which is again sorted and sent to the next sort processor. A result is shown in Table 19.

TABLE 19

| 87654321, ... |
|---|

A similar processing is performed from the No. 4 sort processors onwards.

Figure 15:
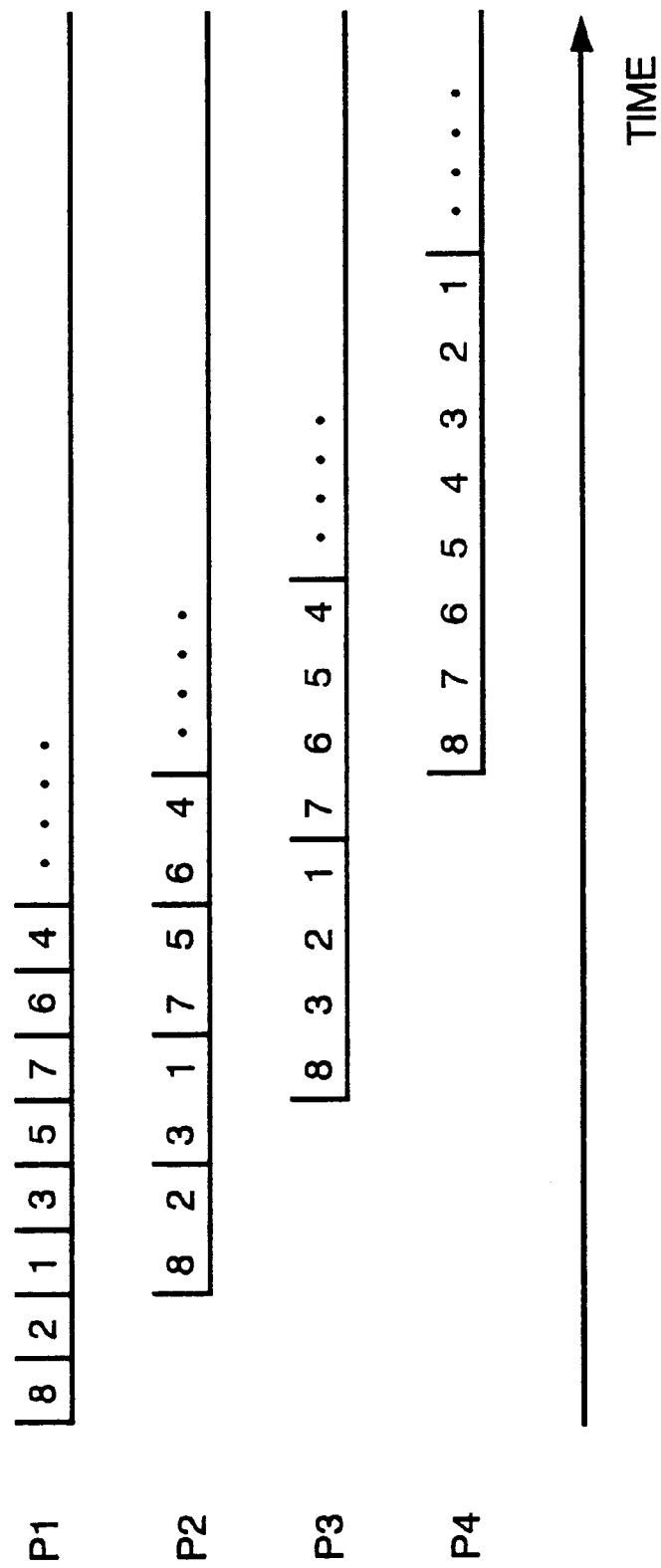
FIG. 15 is the timing chart showing the content of processing in the data processing apparatus in the related art.
Figure 16:
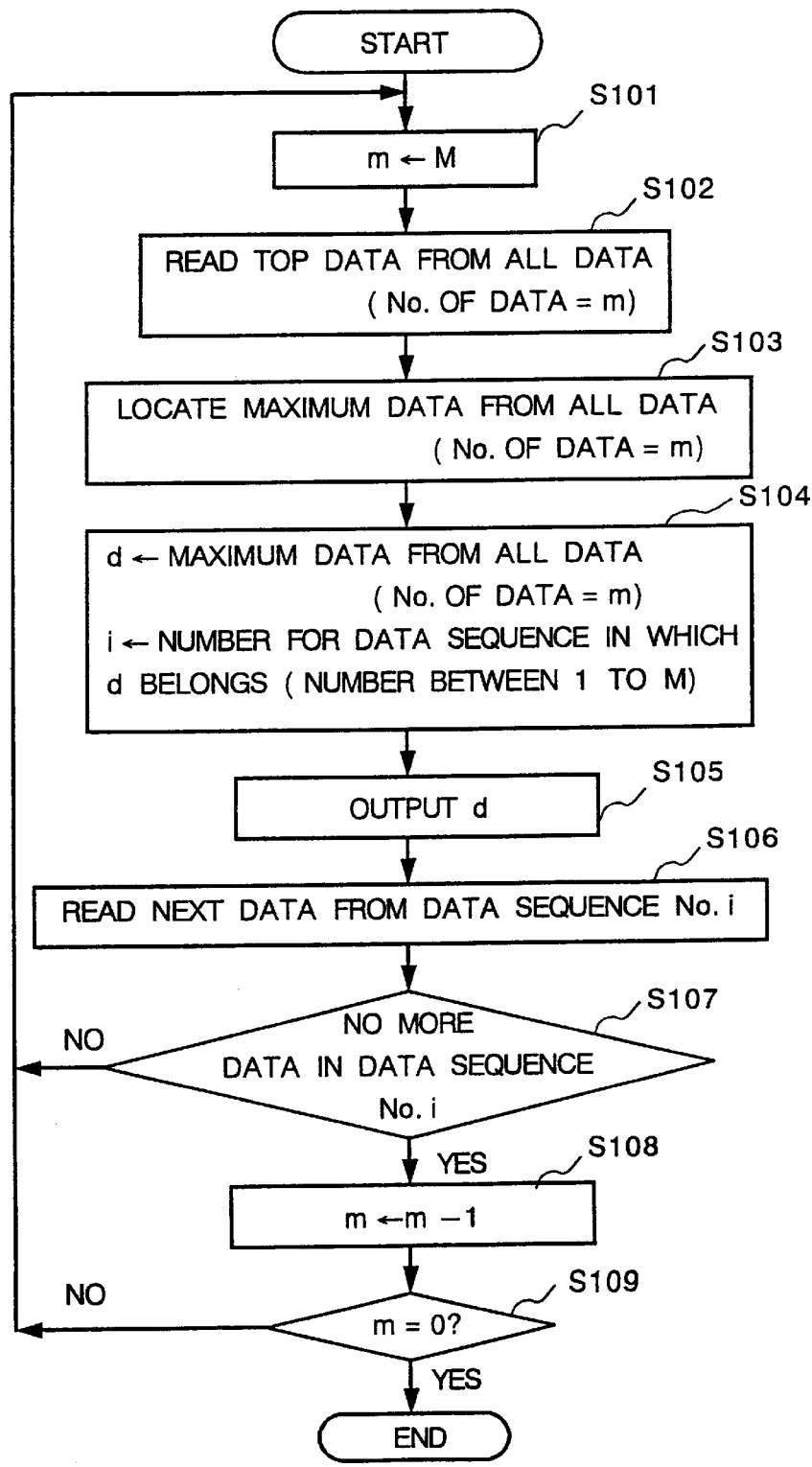
FIG. 16 is the flow chart showing the operation of the merge processing unit of the data processing apparatus in the related art.
Figure 17:
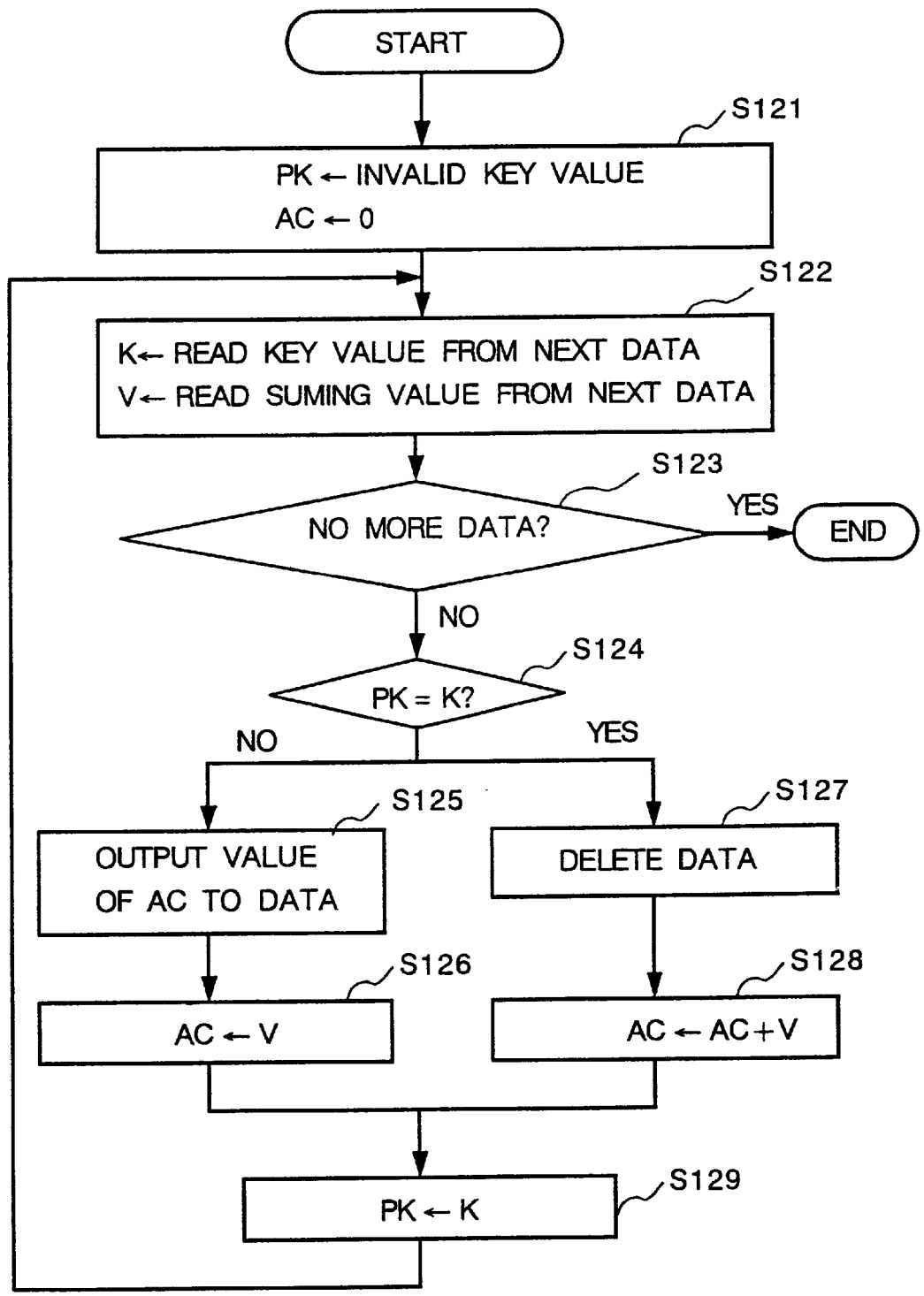
FIG. 17 is the flow chart showing the operation of the sum processing unit of the data processing apparatus in the related art.

As can be seen in FIG. 15, all of the sort processors 21 can start processing before completing all of the processing in the previous sort processor 21. Therefore, the result of sorting is outputted in parallel with the sequential data input, although there is with some delay.

Figure 3:
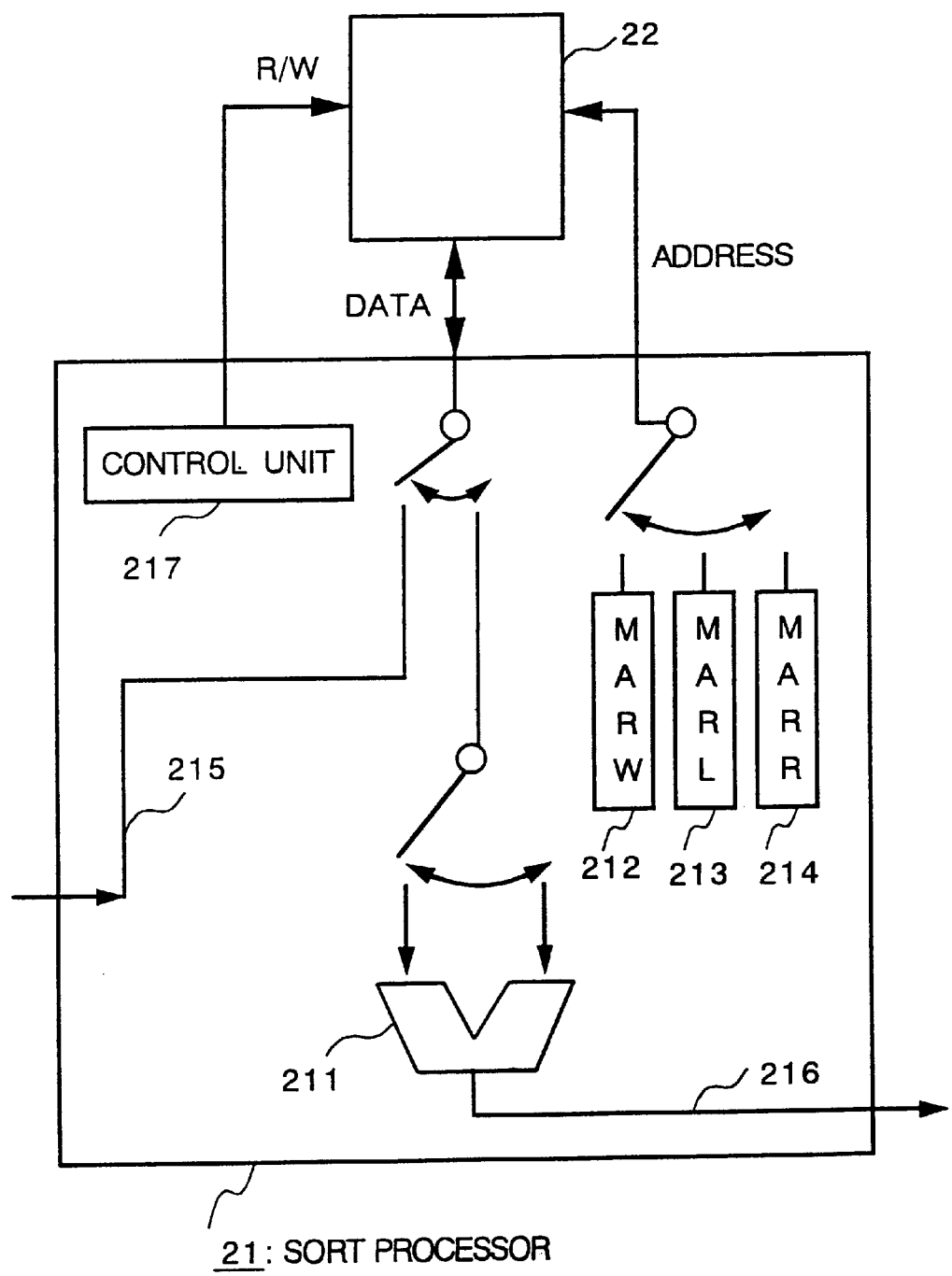
FIG. 3 illustrates the configuration of a sort processor for the embodiment 1.

FIG. 3 shows a detailed illustration of the sort processor 21. The sort processor 21 receives data sent from a previous sort processor 21 through data line 215. The received data is loaded to memory unit 22 connected through the data line 215. An address register MARW 212 (for writing) is used for address control. The data loaded in this manner is read by address registers MARL 213 and MARR 214 (for reading) and inputted to a comparator 211. A result of the comparator is sent to the next sort processor 21 through a data line 216. The operation is controlled by a control unit 217 situated inside the sort processor.

The data of Table 15 is sorted by the sort processing unit 2 having the previously described sort processors 21, and a result of the sorting is shown in Table 20.

TABLE 20

| | |
|---|---|
| (TOKYO, 110, TV, 0000, 1, 100) | |
| (TOKYO, 110, TV, 0000, 2, 200) | TOTAL OF TOKYO, 110, TV |
| (TOKYO, 110, TV, 0001, 0, 0) | |
| (TOKYO, 110, RADIO, 0000, 1, 30) | TOTAL OF TOKYO, 110, RADIO |
| (TOKYO, 110, RADIO, 0001, 0, 0) | SUBTOTAL OF TOKYO, 110 |
| (TOKYO, 110, *, 0010, 0, 0) | TOTAL OF TOKYO, 111, TV |
| (TOKYO, 111, TV, 0001, 0, 0) | TOTAL OF TOKYO, 111, RADIO |
| (TOKYO, 111, RADIO, 0001, 0, 0) | SUBTOTAL OF TOKYO, 111 |
| (TOKYO, 111, *, 0010, 0, 0) | SUB TOTAL OF TOKYO, |
| (TOKYO, *, *, 0100, 0, 0) | TOTAL OF OSAKA, 110, TV |
| (OSAKA, 110, TV, 0001, 0, 0) | |
| (OSAKA, 111, RADIO, 0000, 2, 60) | TOTAL OF OSAKA, 110, RADIO |
| (OSAKA, 110, RADIO, 0001, 0, 0) | SUBTOTAL OF OSAKA, 110 |
| (OSAKA, 110, *, 0010, 0, 0) | TOTAL OF OSAKA, 111, TV |
| (OSAKA, 111, TV, 0001, 0, 0) | TOTAL OF OSAKA, 111, RADIO |
| (OSAKA, 111, RADIO, 0001, 0, 0) | SUBTOTAL OF OSAKA, 111 |
| (OSAKA, 111, *, 0010, 0, 0) | SUBTOTAL OF OSAKA |
| (OSAKA, *, *, 0100, 0, 0) | GRAND TOTAL |
| (*, *, *, 1000, 0, 0) | |

The sort processing unit 2 presumes that the result of sorting the data having identical sort keys is in the order of the data input. That is, the sum value records are sent after all of the input data are sent to the sort processing unit 2. By doing so, for combination of each sort key, the sum value record is guaranteed to be the final record within the record groups having the identical sort keys, i.e. the sum value records will be outputted always after the output of the data records. However, if the sort processing unit 2 has no such feature, then sort for the sort keys by including the sort key coinciding field should be performed so that the created data will always come out after the inputted original data.

As apparent from this example, in a last record of the data with identical sort keys, one of the bits in the sort key coinciding field is 1, and this bit position indicates which sum level of content of the summing results should be outputted.

Figure 6:
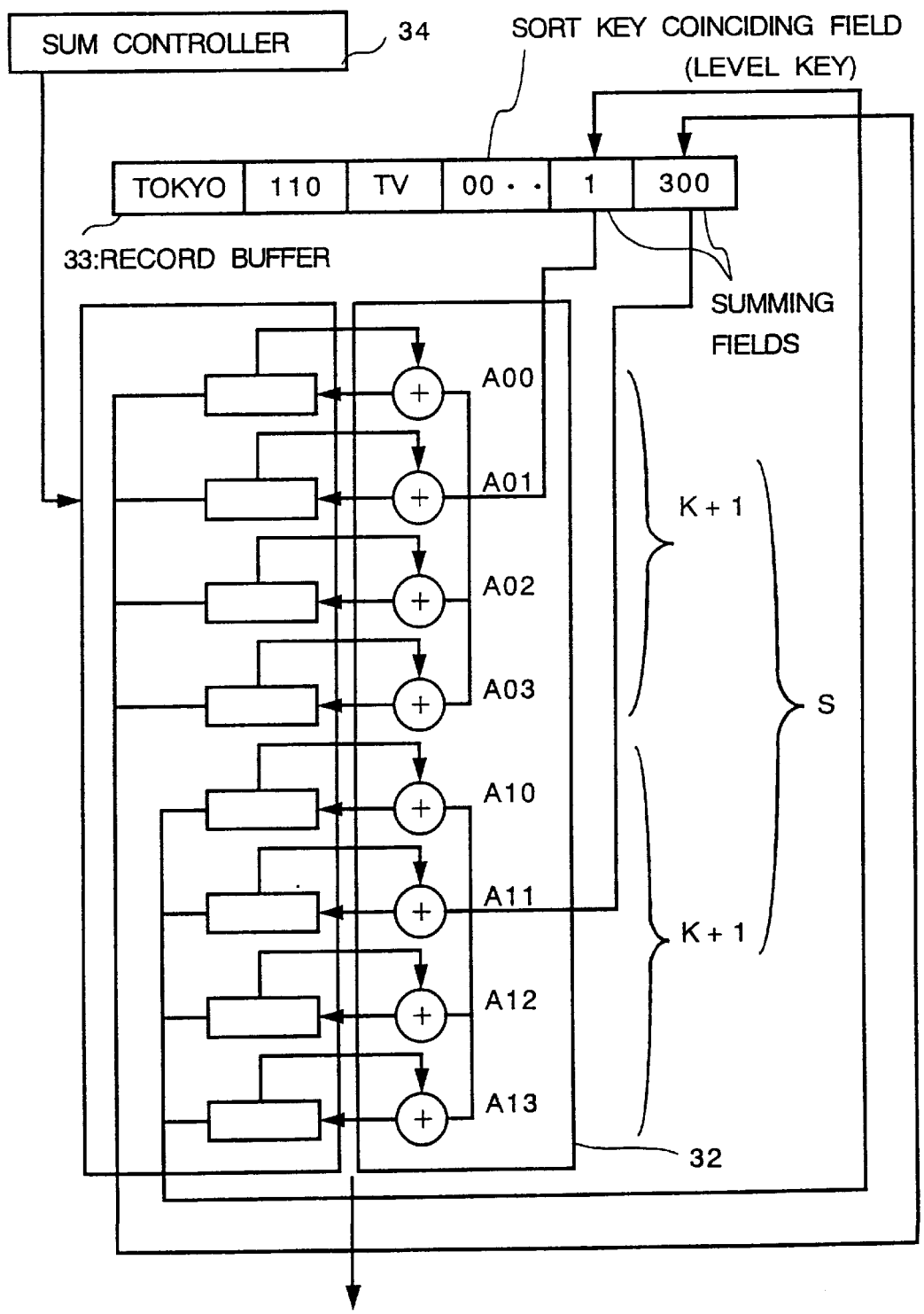
FIG. 6 illustrates the configuration of the sum processing unit for the embodiment 1.

The sum processing unit 3 is described next. FIG. 6 shows a detailed illustration of the sum processing unit 3. The description of the numbered components indicated in the FIG. 6 are: accumulation registers 31; adders 32; a record buffer 33; and a sum controller 34. A number of registers in the accumulation registers 31 are (K)×S, where a numeral K is a number of the sort keys and S is a number of the summing fields. The number of adders is same as the number of registers. The adder is denoted as Aij. The Aij is an adder corresponding to the sum value of jth bit of the sort key coinciding field for ith summing field.

The operation of the sum processing unit 3 is described next. Previous to the processing operation, all of the accumulation registers 31 are initialized to 0. The sorted data sent from the sort processing unit 2 or the merge processing unit 7 are loaded to the record buffer 33 one at a time. The sum controller 34 refers to the sort key coinciding field of the loaded data.

When all the values of the sort key coinciding field are 0, the sum controller 34 operates all of the adders 32. The adder adds the corresponding accumulation register values and the summing field values of the data in the record buffer 33, and the added value is reloaded to the accumulation register. The record in the record buffer 33 are not updated so the record is not outputted.

If the Bth bit (B=0, . . . ,K) of the sort key coinciding field is 1 bit, this is a data that keeps a summing result. The content of S accumulation registers AiB(i=0, . . . ,S−1) are loaded to corresponding fields in the record buffer. Next, the value of the accumulation register is cleared to 0. This time, the record of the record buffer is updated, so they will be outputted. The sort key coinciding fields are removed when outputting.

FIG. 9 is a processing result after completion of sum processing showing a state of storing data including input data, output data and accumulation registers.

Figure 7:
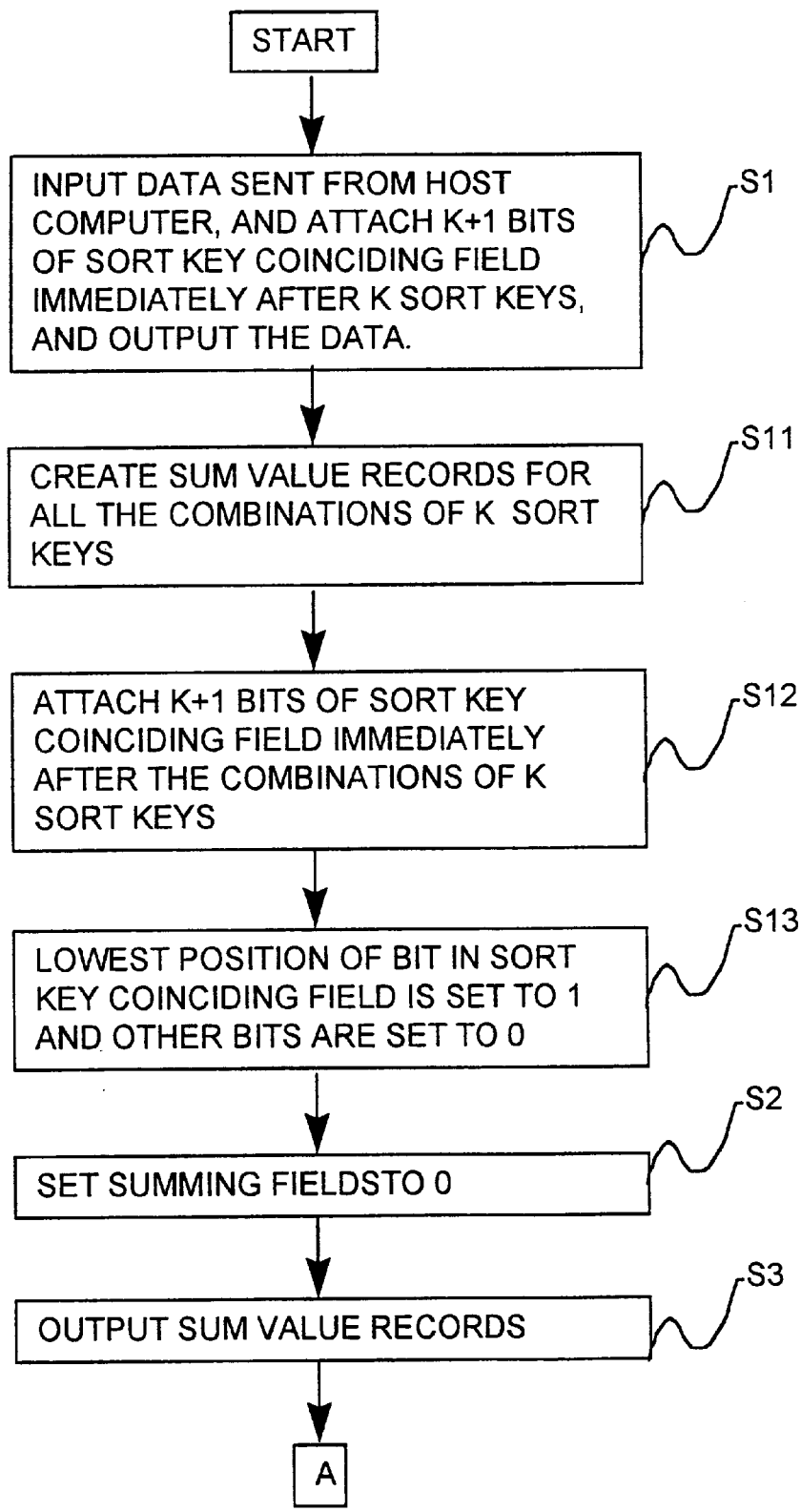
FIG. 7 is the flow chart showing the operation of the sum processing unit for the embodiment 1.
Figure 8:
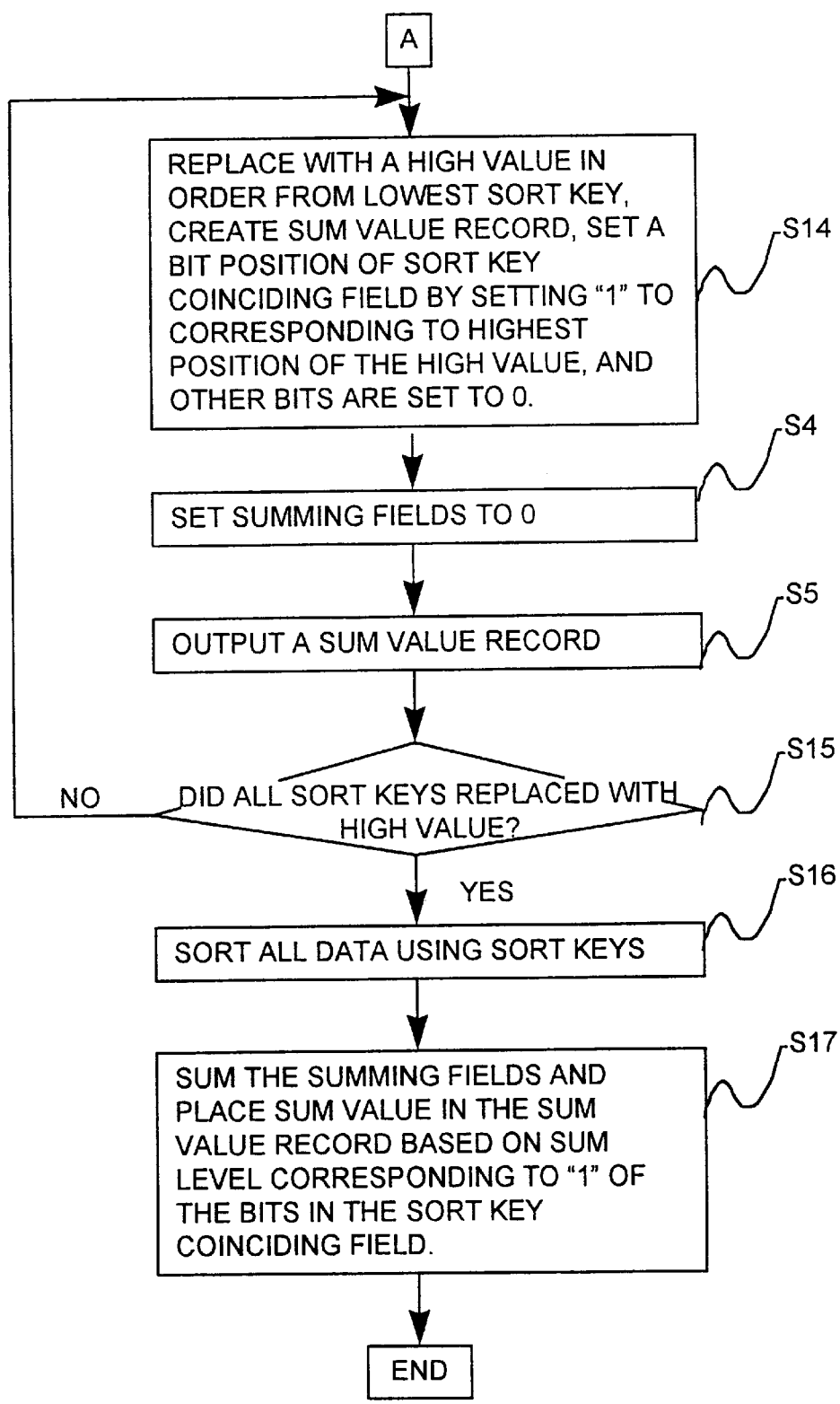
FIG. 8 is the another flow chart showing the operation of the sum processing unit for the embodiment 1.

FIGS. 7 and 8 are flow charts for the previously described operations. Firstly, the sort key coinciding field is attached to the inputted record and outputted to the sort processing unit 2 (step S1). Next, all the possible combination using K sort keys are used to create sum value records (step S11). K bit of sort key coinciding field is attached immediately after the sort key of the sum value records with all the combination of sort keys (step S12). A lowest (rightmost) position (Kth bit) of the bits in the sort key coinciding field is set as 1 and all other bits are 0 (step S13). The values of sum fields are set to 0 (step S2). The sum value records are outputted to the sort processing unit 2 (step S3). In step S14, in an order from the low position (from right to left) of the sort keys, the sort keys are replaced to the high value to create the sum value records. Within the sort keys replaced by the high values, the only one bit position of sort key coinciding field corresponding to the position of a leftmost high value of sort key is set to 1 and all other bits are set to 0. The value of the summing fields are set to 0 (step S4). Then the sum value record is outputted to the sort processing unit 2 (step S15). Then at the step S15 it is determined whether all of the sort keys are replaced to the high value. When the replacing is not complete, the step returns to the step S14 to complete the replacing process. If the replacing is complete, the step proceeds to the step S16 for sorting all of the sort keys at the sort processing unit 2. When one of the bits in the sort key coinciding field is 1, the sum processing unit 3 performs sum of the corresponding sort keys in that sum level (step S17) and the process completes.

A case when the amount of data exceeds the capacity of the sort processing unit 2 is considered next.

In this case, the data processing apparatus 1 implements its process in 2 stages.

As the first stage, the data is sent in the following order: the key replacement unit 5→the sum value record creating unit 4→the sort processing unit 2→the sum processing unit 3. The previously described process is done for every capacity of the sort processing unit 2. In specific terms, when the data being sent is 1 GB, and when the capacity of sort processing unit is 128 MB, the previously mentioned process is performed for every 128 MB, and eight results of summing are created. Note also that the interim results need not always be summed in the first stage. For interim results, the key replacement, the sum value record, and the sort key coinciding field are outputted as they are. The interim results are once returned to the host computer, and stored in a magnetic disk (not illustrated) of the host computer 8.

In a second stage, the interim results created in the first stage as described previously are resent from the host computer 8 to the data processing apparatus 1 in the following order: the sum value record creating unit 4→the merge processing unit 7→the sum processing unit 3. The interim results summed (or not summed) are created in the first stage, however, input data are taken as the original data in the second stage. The final sorting process is done in the merge processing unit 7. The merged result from the merge processing unit 7 are outputted and summed at the sum processing unit 3.

Embodiment 2

The embodiment 2 of the present invention illustrates a case of using a plurality of data processing apparatuses.

One of the preferred embodiment in dealing with the data exceeding the capacity of sort processing unit 2, by using a plurality of data processing apparatus 1 is described. In the present embodiment, it is assumed that the capacity of sort processing unit 2 is represented by a number of sorting possible records which is N, and a plurality M number of data processing apparatus 1 are used to process the data up to the amount of (N−1)×M+1 data. Normally, the value of N are several hundred thousand to several million, so the amount of data can simply be taken virtually as MN.

Figure 10:
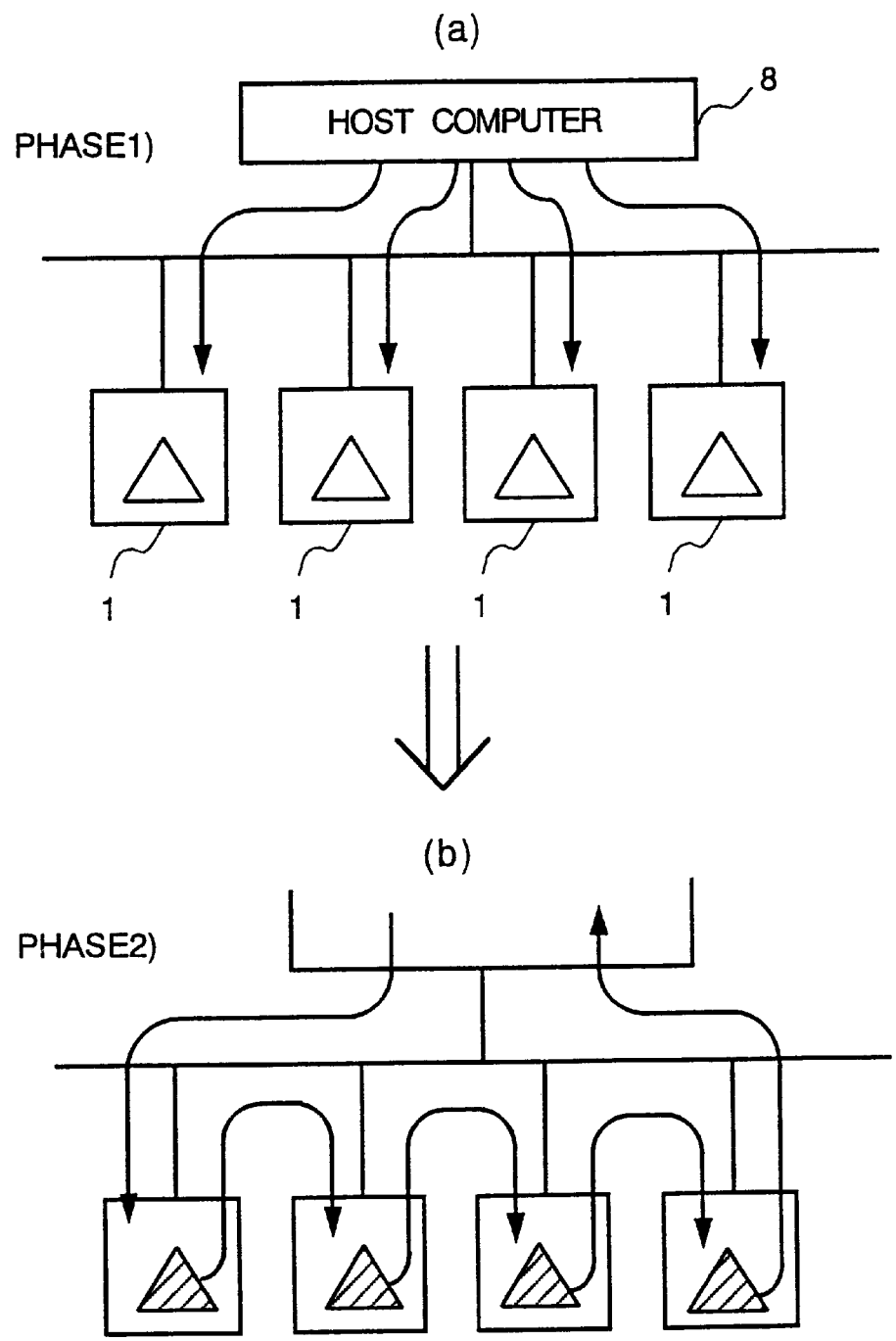
FIG. 10 illustrates the system configuration for the embodiment 2.

FIG. 10 illustrates an operation of the preferred embodiment 2. In FIG. 10, M(=4) data processing apparatus 1 are being used. For this embodiment, the overall capacity of the sort processing units 2 will be 4 times greater than the case of using single data processing apparatus 1. The process is implemented using 2 stages.

In (a) of FIG. 10, when the process begins, the host computer 8 divides the data for processing into four. The divided quarter of the data are inputted in parallel into the four data processing apparatus. However, for the case when a sort possible data capacity is N for the sort processing unit 2, data up to N−1 data are inputted. Due to this, total amount of (N−1)×M data are inputted to the four data processing apparatuses 1. Summing of divided four data in the stage 1 is not always necessary.

After the completion of the stage 1 process as described previously, as shown in (b) of FIG. 10, the host computer 8 outputs the final data to the first data processing apparatus 1. N data are inputted to the first data processing apparatus 1, and the sum result from the sum processing unit or sorted result from normal processing are outputted. The sort results is outputted immediately after the input of final data. In the case of using a single data processing apparatus 1, the result is returned to the host computer for completion, however, for the case of using a plurality of data processing apparatuses, the results are inputted to the next data processing apparatus 1.

The amount of data inputted to the next data processing apparatus 1 is N−1 data, which is a state of waiting for that final data. Instead of the final 1 data, the sorted result or sum result from the previous data processing apparatus 1 may be inputted. In general, it is possible for a sort processing unit to input a plurality of sorted data instead of one final data, and sort them. This is described using Table 21.

TABLE 21

| |
|---|
| 8, 2, 1, 3, 5, 7, 6, 4, ... |
| → 82, 31, 75, 64, ... |
| → 8321, 7654, ... |
| → 87654321, ... |

Similar to the previous example, instead of the final data "4", consider a case of inputting a sorted data "842" as illustrated in Table 22.

TABLE 22

| |
|---|
| 8, 2, 1, 3, 5, 7, 6, 842, ... |

In the first sort processor 21 in the sort processing unit 2, the data are merged in a similar manner as: 8 and 2, 1 and 3, 5 and 7; and outputs to the next sort processor 21 as: "82", "31", and "75". For data "6" and "842", the operation is described below. First of all, "6" and "8" are loaded to the memory unit 22, and these are sent to the comparator 211 in an ordinary manner. The resulting output from the comparator 211 is "8". Normally, when "8" is the output result, output of "6" follows and this cycle ends, however, in the case shown in Table 22, the input data "8" is followed by "42". This situation is same as a following situation. For example, assume that the next data shown in Table 23 is inputted to the sort processor 21.

TABLE 23

| |
|---|
| 9996 |
| 9842 |

When the data shown in Table 23 are compared for merging, "999" of the "9996" is compared in order with "9" of the "9842" and outputted in order. Then "8" is outputted. This is a same situation as the above case of outputting "8". The sort processor 21 operate without any relation to a position in the sort processing unit 2. Accordingly, the sort processor 21 operates same as the case of outputting "8" for both cases, and outputs result shown in Table 24.

TABLE 24

| |
|---|
| 8642 |

The second and the third sort processors operate in the similar manner, and a result is shown in Table 25.

TABLE 25

| |
|---|
| 8, 2, 1, 3, 5, 7, 6, 842, ... |
| → 82, 31, 75, 8642, ... |
| → 8321, 876542, ... |
| → 8876543221, ... |

To a sorted result of Table 25, the sum processing is possible.

Accordingly, without any modification to the preferred embodiment 1, by inputting processing result from the first data processing apparatus 1 to the second data processing apparatus 1, the N+N−1 data processing is possible as a whole.

Figure 11:
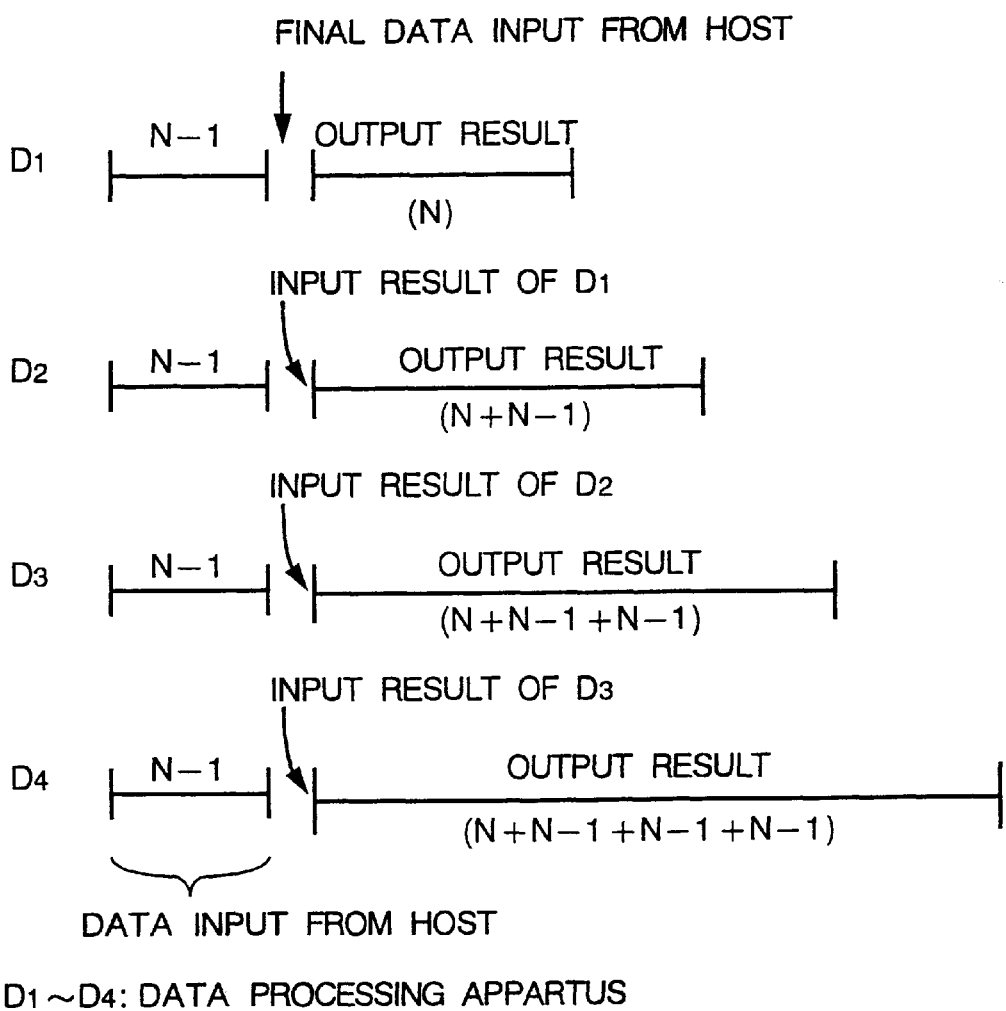
FIG. 11 is the timing chart of the data processing for the embodiment 2.

Accordingly, a large scale data processing is possible using M(=4) data processing apparatuses by inputting the result of the second data processing apparatus to the third one, and inputting the result of the third data processing apparatus to the fourth one. This is illustrated in FIG. 11.

Figure 12:
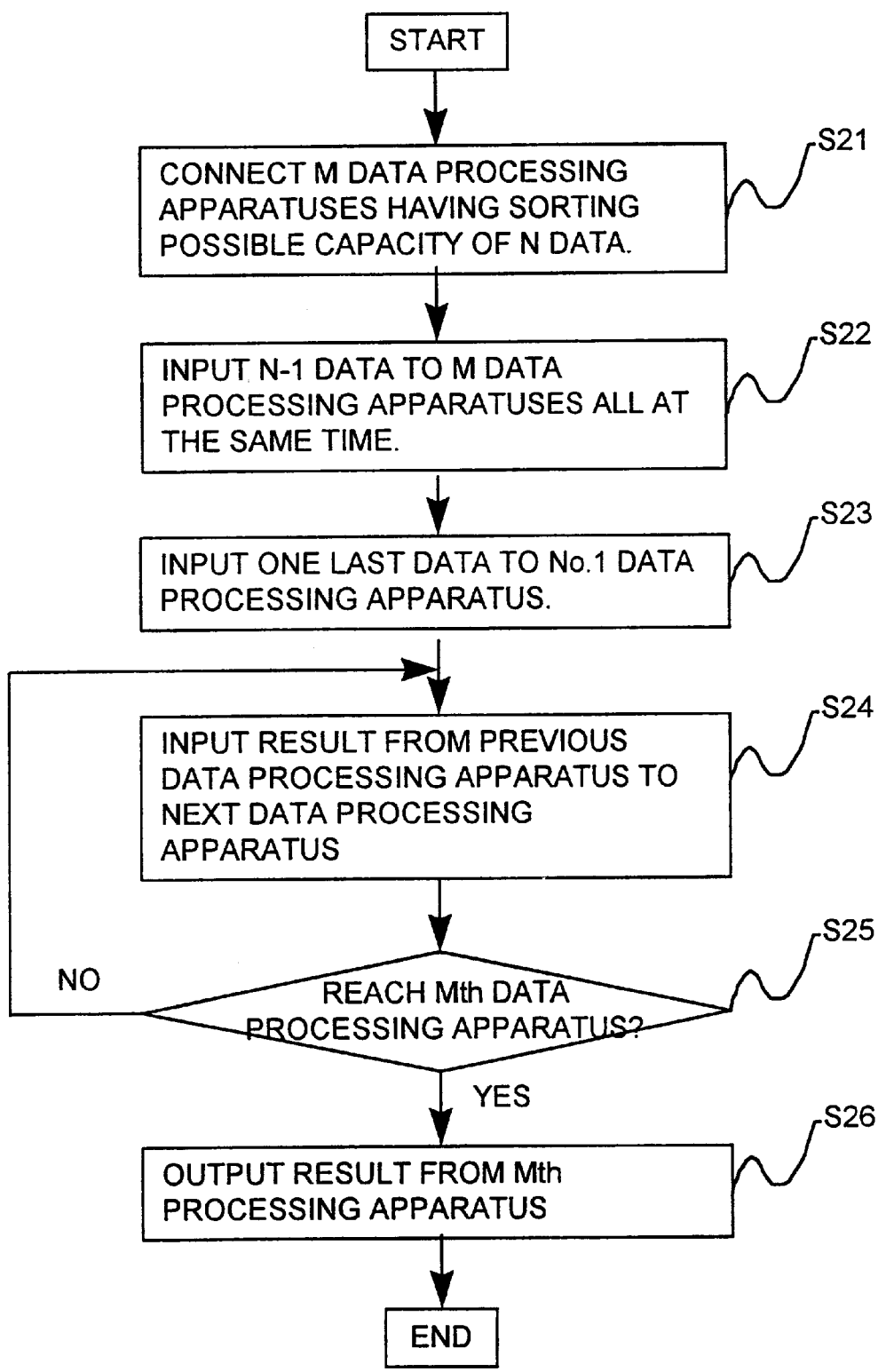
FIG. 12 is the flow chart showing the operation of the system for the embodiment 2.
Figure 13:
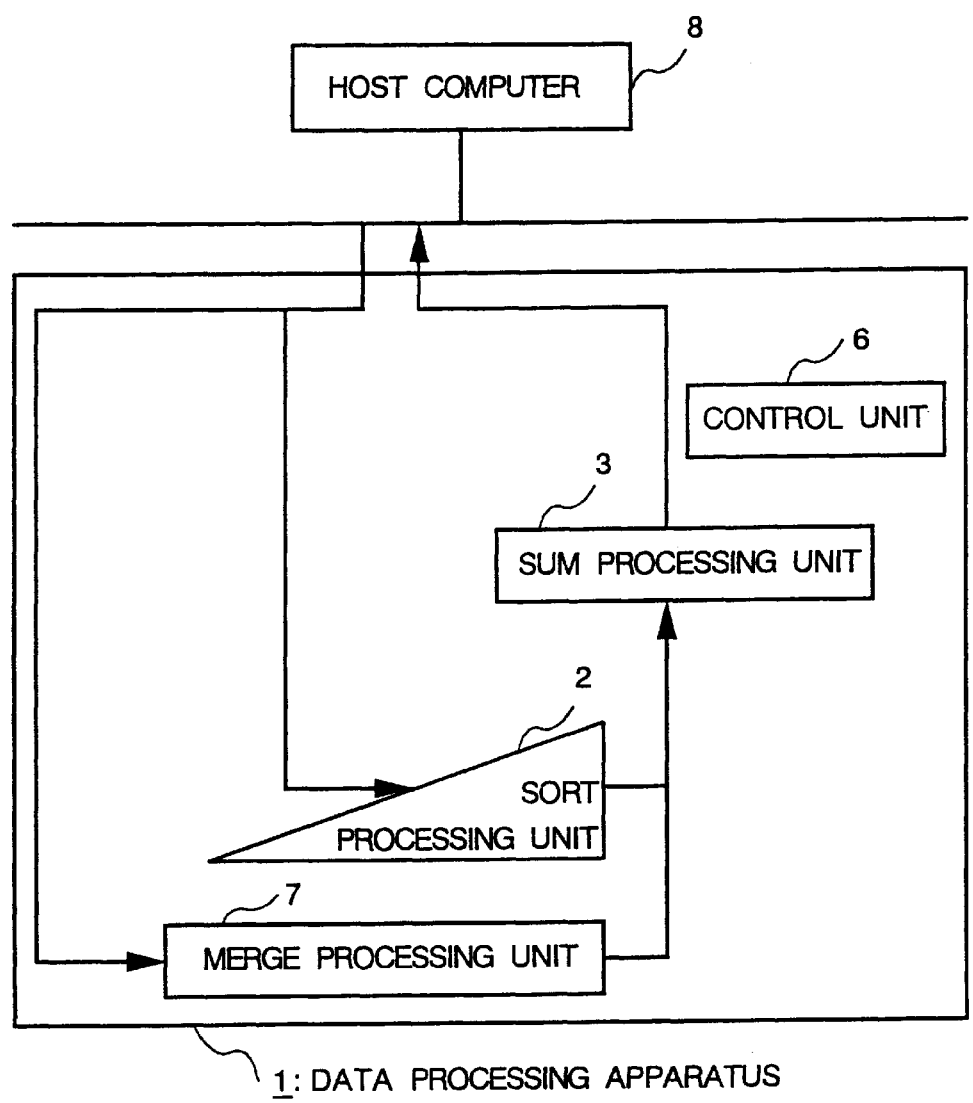
FIG. 13 illustrates the configuration of the data processing apparatus in the related art.
Figure 14:
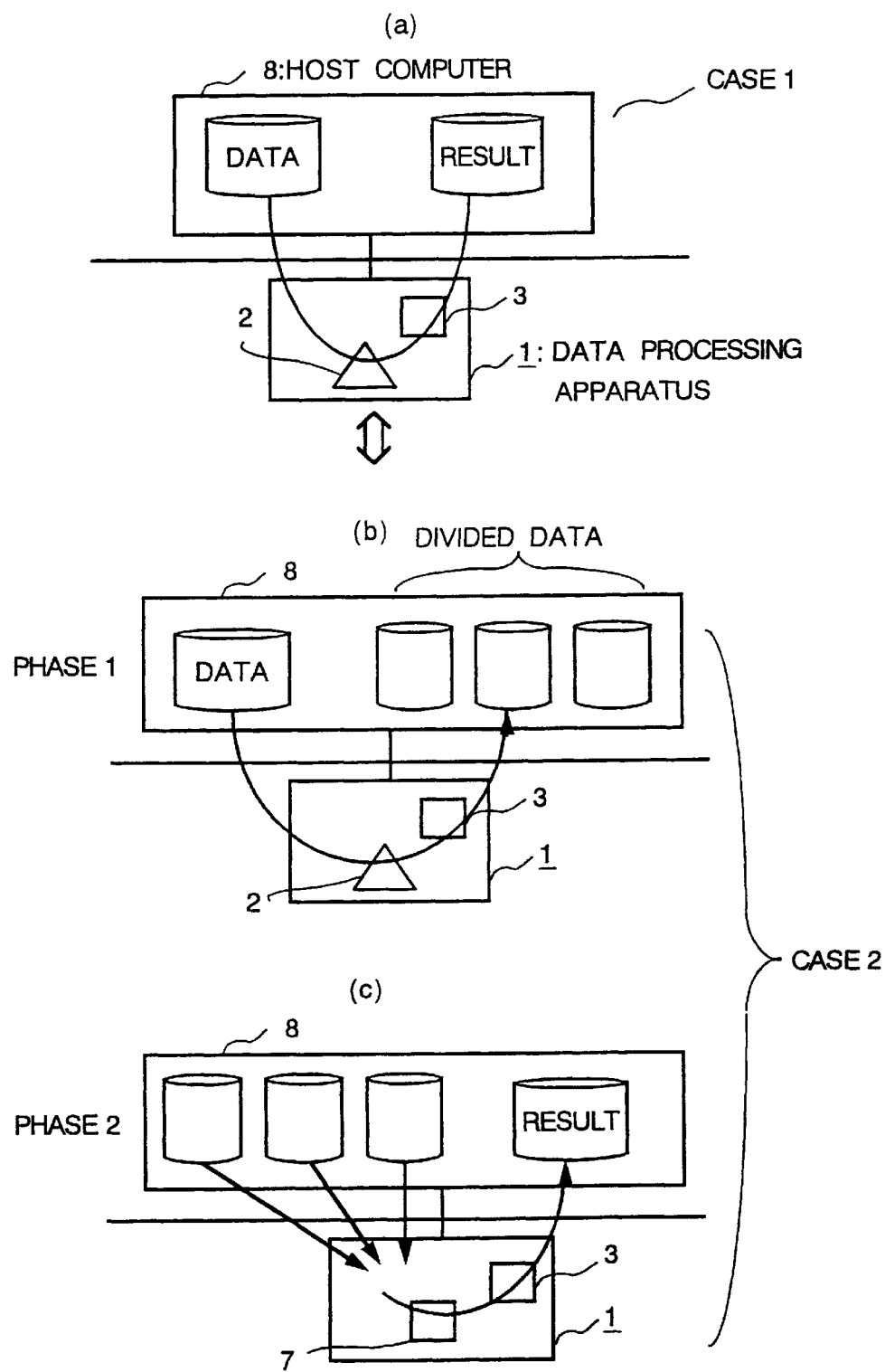
FIG. 14 illustrates two cases of the data processing situations in the related art.

The operation of the preferred embodiment 2 is illustrated in the flow chart of FIG. 12. A plurality of M number of data processing apparatuses with the processing possible capacity of N data are connected (step S21). N−1 data are inputted to the M data processing apparatuses at the same time (step S22). The remaining one last data is inputted to the first data processing apparatus (step S23). A result of the data processing apparatus is inputted to the next data processing apparatus (step S24). The data processing apparatus determines whether it has reached the Mth data processing apparatus (step S25), and if not, the step returns to the step S24, and if it has, the result of processing in Mth data processing apparatus is outputted (step S26).

The data processing apparatus and the data processing method of the present invention has the following effects.

The layered sum processing using a large quantity of data is implemented in high speed by inserting the level key indicating the sum level, and by outputting the content of the accumulation registers corresponding to the sum level which is indicated by the level key.

The change of the sum level is possible by replacing the sort key with the pre-determined sort key.

The layered sum processing for data exceeding the processing possible capacity is possible in high speed, by dividing the inputted data to amount of processing possible capacities, and by merging the divided data in the merge processing unit.

The layered sum processing for the processing possible capacity of data is made possible by sorting the data, summing the data, and merging the sorted and the summed data.

The layered sum processing for a large quantity of data is possible by using a plurality of the data processing apparatuses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data processing apparatus for processing a data record having a sort key, comprising:
   a sum value record creating unit for creating a sum value record, for summing data in the data record, using the sort key;
   a sort processing unit for sorting the data record and the sum value record; and
   a sum processing unit for inputting the data record and the sum value record sorted by the sort processing unit, and for summing the data in the data record to the sum value record.

2. The data processing apparatus according to claim 1, wherein the sum value record creating unit sets a sort key of the sum value record so as to position the sum value record after the data record by sorting of the sort processing unit.

3. The data processing apparatus according to claim 2, wherein the sum value record creating unit creates a field for identifying the data record and the sum value record, and attaches to the data record and the sum value record; and wherein the sum processing unit performs summing based on the field, without having to compare the sort key of the data record and the sum value record.

4. The data processing apparatus according to claim 3, wherein the sort key of the data record comprises a plurality of K sort keys layered (K≧1);

wherein the sum value record creating unit creates a level key in the field for indicating one of K sum levels, wherein the sum processing unit sums data for the K sum levels based on the level key.

5. The data processing apparatus according to claim 4, wherein the sum value record creating unit creates the sum value records having K sort keys created by all combinations of all values of the K sort keys.

6. The data processing apparatus according to claim 4, wherein the sum value record creating unit creates a sum value record having the K sort keys created by all combinations of all values of the every upper layer sort keys in the layered sort keys.

7. The data processing apparatus according to claim 6, wherein the sum value record creating unit uses one of a high value and a low value to crate one of the K sort keys.

8. A data processing method comprising steps of:

inputting an input data and attaching a level key indicating a sum level of data to the input data;

creating a first data having all combinations of all values of K sort keys, and having an identical format as the input data, and attaching a level key indicating a sum level of data to a created data;

creating a second data with the identical format by replacing a sort key in a low position to a high position of the K sort keys with an identification data equating with one of a high value and a low value, in an order from the low position to the high position, for all combinations of all values of the K sort keys; and sorting all of the data using the sort keys.

9. The data processing method according to claim 8, further comprising steps of:

setting bits of the level key wherein:

for the input data, all the bits in the level key is 0;

for the first data created with the identical format as the input data, a bit at a lowest position in the level key is 1 and the other bits are 0;

for the second data, a bit position corresponding to one of a position of the identification data in the highest position in the level key is 1 and the other bits are 0; and outputting a sum value for the data corresponding to a sum level where one of the bits in the level key is 1.

10. A data processing apparatus, comprising:

a sum value record creating unit for inputting an input data with K (K≧1) sort keys, attaching a level key indicating a sum level of data to the input data, outputting the input data, and for creating data with an identical format as the input data for all combinations of all values of the K sort keys and for all sum levels, attaching a level key indicating a sum level of the data to the created data, and outputting the created data;

a sort processing unit for sorting all of the input data and the created data using the K sort keys; and a sum processing unit having K+1 accumulation registers for summing the sorted data separately, and outputting a content of a accumulation register corresponding to the sum level indicated by the level key.

11. The data processing apparatus according to claim 10, further comprising a key replacement unit for replacing a sort key of the input data with a pre-determined sort key, and for outputting the input data with a replaced sort key to the sum value record creating unit.

12. The data processing apparatus according to claim 10, further comprising a memory unit; and a merge processing unit, wherein the sort processing unit repeats a divisional processing for data with a processing possible capacity without summing the data and stores a plurality of sorted data in the memory unit, and wherein the merge processing unit reads the plurality of sorted data from the memory unit and merges the plurality of the sorted data.

13. The data processing apparatus according to claim 10, further comprising a memory unit; and a merge processing unit, wherein the sort processing unit repeats a divisional processing for a data with a processing possible capacity with summing the data and stores a sorted data in the memory unit, and wherein the merge processing unit reads the plurality of sorted data from the memory unit and merges the plurality of the sorted data.

* * * * *